US009455937B2

(12) United States Patent
Goergen

(10) Patent No.: US 9,455,937 B2
(45) Date of Patent: Sep. 27, 2016

(54) DISTRIBUTED PACKET SWITCH HAVING A WIRELESS CONTROL PLANE

(75) Inventor: Joel R. Goergen, Maple Grove, MN (US)

(73) Assignee: Force10 Networks, Inc., San Jose, CA (US)

(*) Notice: Subject to any disclaimer, the term of this patent is extended or adjusted under 35 U.S.C. 154(b) by 592 days.

(21) Appl. No.: 12/776,562

(22) Filed: May 10, 2010

(65) Prior Publication Data

US 2011/0228779 A1 Sep. 22, 2011

Related U.S. Application Data

(60) Provisional application No. 61/292,922, filed on Jan. 7, 2010.

(51) Int. Cl.
H04L 12/28 (2006.01)
H04L 12/56 (2006.01)
H04L 12/931 (2013.01)
H04L 12/64 (2006.01)
H04W 28/02 (2009.01)
H04W 28/18 (2009.01)

(52) U.S. Cl.
CPC ............... *H04L 49/40* (2013.01); *H04L 12/64* (2013.01); *H04W 28/02* (2013.01); *H04W 28/18* (2013.01)

(58) Field of Classification Search
CPC ...... H04L 12/64; H04L 49/40; H04W 28/02; H04W 28/18
See application file for complete search history.

(56) References Cited

U.S. PATENT DOCUMENTS

| 5,234,348 | A | * | 8/1993 | Konsevich et al. ............ 439/61 |
| 5,786,912 | A | * | 7/1998 | Kartalopoulos ...... H04L 49/254 |
| | | | | 398/1 |
| 7,373,107 | B1 | * | 5/2008 | Wesolowski .................. 455/41.2 |
| 8,200,212 | B2 | * | 6/2012 | Rappaport et al. ......... 455/426.2 |
| 2009/0213869 | A1 | * | 8/2009 | Rajendran ............... H04L 45/00 |
| | | | | 370/420 |

* cited by examiner

*Primary Examiner* — Lonnie Sweet
(74) *Attorney, Agent, or Firm* — Haynes and Boone, LLP

(57) ABSTRACT

A packet network device such as a network switch includes a number of functional cards or chassis modules at least some of which are connected to both an electrical backplane and a wireless backplane. The electrical backplane provides data plane signal paths and the wireless backplane provides control plane signal paths.

25 Claims, 22 Drawing Sheets

DISTRIBUTED PACKET SWITCH HAVING A WIRELESS CONTROL PLANE

CROSS-REFERENCE TO RELATED APPLICATIONS

This application claims the benefit under 35 U.S.C. §119 (e) of U.S. Provisional Patent Application Ser. No. 61/292,922 entitled "Distributed Packet Switch Having a Wireless Control Plane", filed Jan. 1, 2010, the entire contents of which is incorporated by reference.

BACKGROUND

1. Field of the Invention

The present disclosure relates generally to modular packet network devices such as switches and routers having separate data and control planes.

2. Description of Related Art

Packet network devices direct data packets traveling across a network between data sources and destinations. Packet network devices can perform "routing" or "switching" depending on the header information and networking techniques used to direct the data packets. For purposes of the following disclosure, the differences are not of particular interest, and therefore the described packet network devices, no matter how the devices determine egress ports for data packet traffic, will be referred to as "switches" for simplicity.

FIG. 1 shows a high-level block diagram for an exemplary modular packet switch 100. The switch comprises a chassis (not shown) with an electrical backplane 110, to which circuit cards mate in order to communicate with other cards in the chassis. In FIG. 1, the switch accommodates n line cards, LC1-LCn, m switch fabric cards, SFC1-SFCm, and two route processing managers RPM0, RPM1.

Each line card LCx (where x represents any of the line card slot positions 1 to n) receives ingress data traffic from and transmits egress data traffic to peer devices through its external ports to a port interface, Ph. Port interface Ph transmits and receives the physical layer signaling required by the external ports, performs framing, and communicates packet streams for each external port with a packet processor PPx. The ports can be configured for different electrical or optical media via the use of different line card types, different port interface modules, and/or different pluggable optics modules.

For most ingress packet traffic on each line card LCx, a line card packet processor PPx processes the packet, determines one or more switch egress ports for the packet, and queues the packet for transmission through the switch fabric when possible. For most egress packet traffic on each line card LCx, the line card queues the packets arriving from the switch fabric, and selects packets from the queues and serves them fairly to the egress ports. To accomplish these functions, PPx interfaces with a scheduler interface SCHx, a content-addressable memory CAMx, and a line card processor LCPx. PPx notifies scheduler interface SCHx as to the destination line cards for which it has packets queued, and receives switch fabric schedule information back from SCHx. PPx uses the scheduling information to place packets from one or more queues on the switch fabric backplane connections during each scheduling epoch. The switch fabric connections are implemented using unidirectional differential serial bus pairs, with each line card packet processor having at least one ingress pair for each switch fabric card and one egress pair for each switch fabric card. An intermediate serializer/deserializer ("serdes," not shown) may be used between PPx and the backplane differential serial pairs.

Memory CAMx stores lookup tables that PPx accesses to determine what operations to perform on each packet, as well as the next hop destination for each packet. PPx generally constructs one or more lookup keys from the headers and receive port information, etc., and performs one or more lookup operations on CAMx. CAMx returns pointers into instruction memory and next hop memory (not shown), as well as any parameters needed to process the packets.

Line card processor LCPx is a general purpose processor that handles control plane operations for the line card. Control plane operations include programming CAMx and lookup memory according to instructions from the master RPM, programming registers on PPx that tailor the line card behavior, receiving control plane packets (packets addressed to switch 100, e.g., for various routing/switching protocols) from PPx, and transmitting control plane packets (packets generated by switch 100 for communication to a peer device) to PPx for forwarding out an external port. LCPx may implement some control plane functionality for some protocols handled by switch 100.

LCPx also connects to the electrical backplane through a card management FPGA (Field Programmable Gate Array) FPGAx and an Ethernet switch ESWx. The card management FPGA connects through serial management bus interfaces on electrical backplane 110 to master card management FPGAs on the RPMs. The RPMs use the serial management bus to boot line cards, monitor the health of the line card and its environmental parameters, manage power for the line card and its components, and perform basic hardware configuration for the line card. Various registers on FPGAx are readable by line card processor LCPx, allowing LCPx to perform some of its configuration tasks using values stored in the registers by the RPMs.

Ethernet switch ESWx connects to two backplane Ethernet point-to-point links, one linking ESWx to each RPM. LCPx transmits control plane traffic, as well as line card statistics and monitored data plane traffic, to the master RPM using packets transmitted to ESWx. Likewise, the master RPM transmits FIB (Forwarding Information Base) updates and boot images to LCPx for consumption, and control plane packets destined for external peers to LCPx for forwarding to PP1.

Switch fabric card SFC1 is exemplary of the switch fabric cards, which are generally identical in a system. Switch fabric card SFC1 comprises a switch fabric device, SF1, a switch fabric scheduler interface SFSCH1, and a card management FPGA1. Although FPGA1 can be the same type of hardware device as FPGA1 on line card LC1 and have the same RPM interface programming, its other programming is generally specific to the requirements of a switch fabric card. The scheduler interface SFSCH1 does not provide schedule information to each RPM, it merely receives the epoch schedules used to program the switch fabric for each epoch. The switch fabric cards work in parallel according to a common epoch schedule. Each epoch, every switch fabric card has a switch fabric SFy that is programmed the same way through the switch fabric scheduling interface SFSCHy.

The switch fabric SF1 provides serdes interfaces for each line card and a parallel crossbar switch that can switch any of the inputs to any number of the outputs. In one embodiment, the line cards slice up each packet sent to the switch fabric into lanes, sending one byte of the packet to SFC1, the next byte to SFC2, etc., in round-robin fashion on each lane. A receiving line card aligns the lanes incoming from the switch fabric cards and reassembles the packet data. This allows the switch to tolerate malfunctioning switch fabric cards by simply not sending data on a malfunctioning lane.

The route processing managers (RPMs) control all aspects of the overall operation of the chassis. RPM1 and RPM2 are identical, and the switch can run with only one RPM. When two RPMs are present, one is elected as the master, and the other remains on standby. The standby RPM monitors the health of the master, and takes over as master should the first fail. Each RPM RPMx comprises three processors: a control processor CPx, which controls the overall operation of the switch; and two route processors RPx.0, RPx.1, which run different routing/switching protocols, communicate with external peers, and program the line cards to perform correct routing and switching.

Each RPM RPMx also has three bus interfaces to the electrical backplane. A master Ethernet switch MESWx connects through backplane Ethernet links to each line card Ethernet switch, ESWy, and to the control processor and each route processor. A master scheduler MSCHx connects through the backplane scheduling bus to each line card and switch fabric card—the master scheduler determines from the line card requests a switch fabric schedule for each epoch, and communicates this schedule to the line cards and switch fabric cards. A master FPGA MFPGAx connects through backplane serial management bus connections to each other card in the chassis. The master FPGA monitors the health of each other card through heartbeat message exchanges and environmental data collections, and provides an interface for CPx to control the hardware on each card.

As alluded to above, communications between the chassis modules uses four separate bus systems on electrical backplane 110. A packet data bus system connects the line cards and the switch fabric cards, allowing high-speed transfer of data traffic through the switch. Due to the high data rates of this bus and the fact that separate trace groups connect each of n line card slots to each of m switch fabric card slots, this is the largest bus system on the electrical backplane 110. A control plane packet data bus system allows the master routing/switching protocols running on the RPMs to communicate with each other, with the line cards, and with peer devices through the line card external ports. This packet data bus system may be, e.g., a point-to-point Ethernet link between each line card and each RPM card. A scheduling bus system allows the master RPM to coordinate and synchronize the internal transmission of packet data between the line cards and the switch fabric cards. This bus system is separated to preserve critical timing for the exchange of scheduling information between each line card and switch fabric card and each RPM. And a chassis management bus system allows the RPMs to monitor, configure, and manage the hardware on each line and switch fabric card. This bus system may use industry standard relatively low-speed serial management bus protocols, such as System Management Bus (SMBus), across point-to-point links between each line card or switch fabric card FPGA and each master FPGA.

FIG. 2 illustrates one embodiment of electrical backplane 110 in perspective view. Backplane 110 distributes power and signaling between the various card described above, using connectors aligned with card slots. A top row of card slots provides two central RPM slots and fourteen line card slots, seven outboard of the RPM slots to the left of the RPM slots and seven outboard of the RPM slots to the right of the RPM slots. A bottom row of card slots provides nine switch fabric card slots. Outboard of the switch fabric card slots on either side, power supply connection regions 120A and 120B allow connection of A and B redundant power supplies to backplane 110 in order to distribute power to the cards.

Each card slot provides power connectors and signaling/digital ground connectors. For instance, two power connectors LCPC1A and LCPC1B provide A and B power from the backplane to the first line card slot, and a signaling connector LCSC1 provides signaling connections for each of the four described bus systems to the first line card slot. Although not all connectors have been labeled, those that are labeled include: A power connectors, RPPC0A and RPPC1A, for RPM0 and RPM1 card slots, respectively; signaling connectors, RPSC0 and RPSC1, for RPM0 and RPM1 card slots, respectively; the signaling connector LCSC14 for the last line card slot; the signaling connectors SFSC1 and SFSC9 for the first and last switch fabric card slots, respectively; and a representative power connector SFPC5B for B power delivery to the fifth switch fabric card slot. The other, unlabeled connectors provide similar functionality to cards inserted in the corresponding slots.

FIG. 3 shows the same perspective view of the backplane 110, this time with two line cards (LC11 and LC13) and three switch fabric cards (SF5, SF6, SF7) connected to the backplane. The switch chassis and chassis card carriers have been omitted for clarity—in an actual system, the chassis and card carriers serve to partition each card from its neighbors to control electromagnetic interference (EMI), while allowing a common cooling solution. As shown, line card LC13 contains a logic board LB13 and a port interface module PIM13. Port interface module PIM13 couples signals from eight external port modules (exemplary module P13-1 is labeled) to and from the logic on logic board LB13. Different port interface module types can be used to couple a desired port mix to the line cards.

FIG. 4 shows a side view of backplane 110, with the front sides of the attached line card LC13 and attached line card SF7 visible, showing further details of the physical assembly. Within backplane 110, four thick central power planes distribute A and B power from the power supply connectors (120A and 120B, FIG. 2) to the power connectors LCPC13A, LCPC13B, SFPC7A, and SFPC7B. These four central power planes lie between several low-speed signal layers, serving for instance scheduling bus traces, serial management bus traces, and backplane Ethernet traces. Outboard of the low-speed signal layers, high-speed signal layers serve the data plane switch fabric-to-line card differential pairs, and other signals when possible. Between adjacent high-speed signal layers, between the adjacent high-speed and low-speed signal layers, and between adjacent power delivery and low-speed signal layers, digital ground layer provide noise isolation and a single-ended impedance reference. The digital ground layers and the traces on the signal layers connect to designated pins, e.g., on signal connectors LCSC13 and LCSC7, to provide signaling functionality between the various system cards.

DETAILED DESCRIPTION

The use of four separate bus systems in the prior art electrical backplane, with each bus system providing point-to-point service between a multitude of card pairings, results in a backplane with a significant number of signaling layers, traces, and connectors. Generally, the embodiments described below reduce this complexity by moving the three control bus systems completely off the electrical backplane. Instead, the control bus systems reside on a separate, wireless backplane.

Moving the control bus systems off the electrical backplane can create significant advantages in a given embodiment. First, by essentially removing most of the signaling buses from the backplane, except for the high-speed data connections, it becomes much easier to control noise effects on the high-speed data connections, as the noise spectra emitted by all high-speed data connections are similar. Second, if the number of signaling layers were reduced due to this redesign, the cost of the board could be reduced not only due to the reduction in layers but also due to the reduction in signaling thruhole length. Reduced signaling thruhole length generally reduces the complexity of the measures needed to combat reflections in the long signaling thruholes required by a thick backplane. Third, as the number of layers, traces, and connectors is reduced, the potential points of failure are greatly reduced. Fourth, trace routing can generally be shortened and simplified, with control bus signal connector blocks and their attendant thruholes removed. Many other potential advantages are discussed below.

Figure 5:
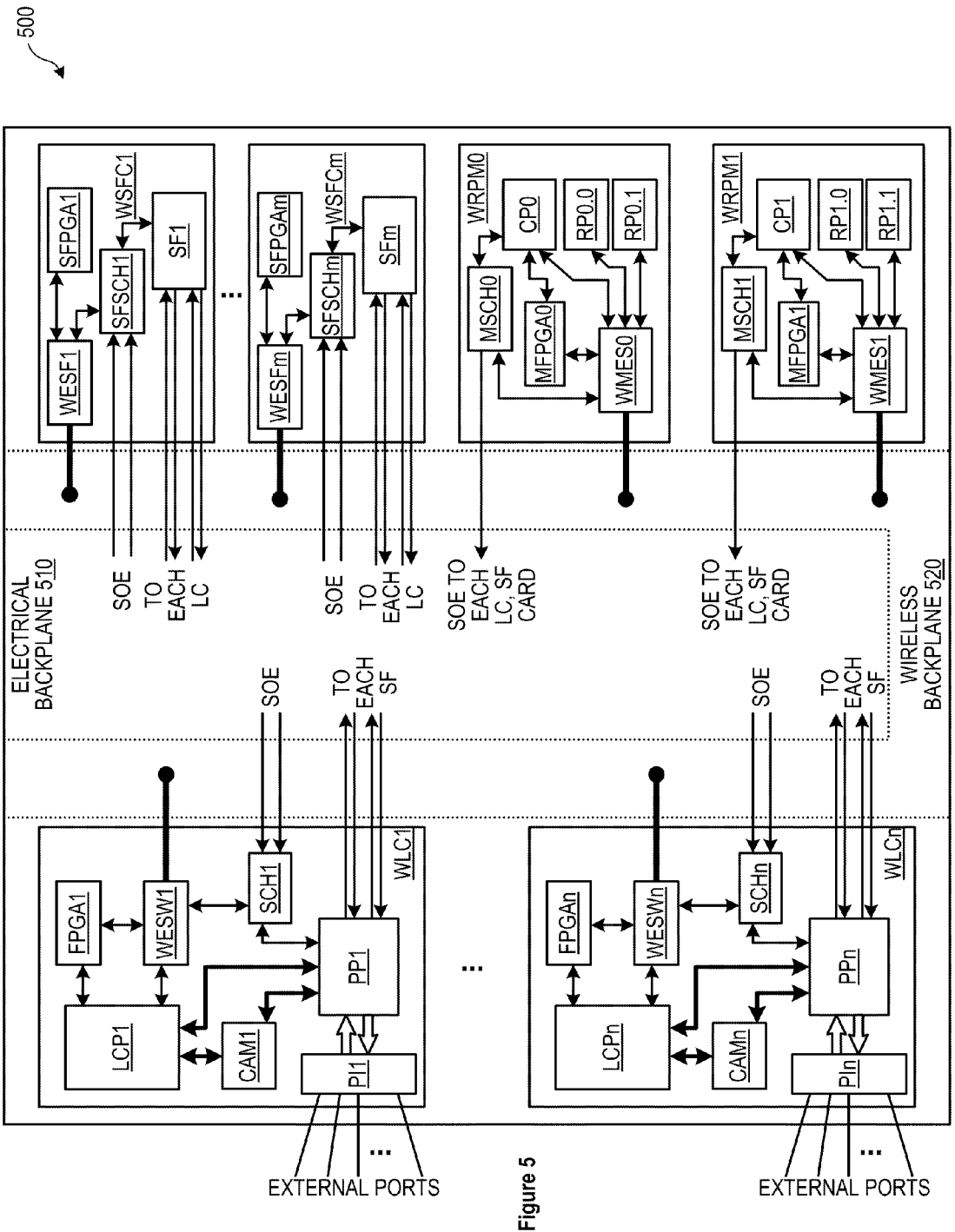
FIG. 5 contains a block diagram for a packet switch according to an embodiment.

FIG. 5 contains a block diagram for a first switch embodiment 500. Instead of the electrical backplane of the prior art, switch 500 contains both an electrical backplane 510 and a wireless backplane 520. Electrical backplane 510 contains the high-speed differential pairs used for data plane communications between the line cards and switch fabric cards. Electrical backplane 510 also contains SOE (start of epoch) traces, used by the RPMs to transmit the critical SOE clock timing used to synchronize switch fabric epoch timing among the line cards and switch fabric cards. Wireless backplane 220 bundles the network protocol traffic, scheduling traffic, and card management traffic onto one or more wireless channels, replacing the prior art electrical backplane Ethernet, scheduling, and card management buses. In an alternate embodiment, the wireless backplane can also carry the SOE signaling, with an appropriate design that uses the wireless channel to synchronize clocks on each card. In another alternate embodiment, the electrical backplane 510 can bundle the network protocol traffic, scheduling traffic, and card management traffic onto one or more wireless channels and the wireless backplane can contain the high-speed differential pairs used for data plane communications between the line cards and switch fabric cards.

Each card in FIG. 5 is equipped with a wireless transceiver. For example, wireless line card WLC1 includes a wireless Ethernet switch WESW1 having an antenna coupled into the wireless backplane 520. All control plane traffic passing between LCP1 and one of the RPMs passes through WESW1. Likewise, all scheduling traffic passing between scheduler SCH1 and one of the RPMs passes through WESW1. And card management traffic passing between FPGA1 and one of the RPMs passes through WESW1. Either scheduler interface SCH1 and FPGA1 can implement an Ethernet interface for communications with WESW1, or WESW1 can add Ethernet framing/headers for each.

When an RPM has information for a component of WLC1 that it must transmit wirelessly, it encapsulates the information in an Ethernet frame addressed to the appropriate component of the appropriate card slot. In one embodiment, each chassis uses a standard set of Ethernet addresses for wireless backplane communications, based on a given Organizationally Unique Identifier (OUI) range that the manufacturer has reserved for this purpose. The addresses are assigned by modifying one range of assigned bits of a base address with a slot identifier, and another range of assigned bits of the base address with a component or function identifier. Other addresses can be reserved as broadcast addresses by replacing the bits assigned to the slot identifier with a group identifier, such as "all line cards," "all switch fabric cards," "all cards," "all management cards," etc. This allows a function on one card to forward common information or requests to a group using a single packet.

Each card must know its location in order to assign itself the correct wireless channel addresses. The FPGA on each card detects the slot in which the card was inserted based on a set of voltage-coded pins on the backplane slot card connectors. The slot ID is stored in an FPGA register accessible to the card processor or wireless Ethernet switch directly over a Peripheral Component Interconnect (PCI) bus. Alternately, the FPGA can use the card ID to store one or more correct Ethernet addresses directly in PCI-accessible registers, from which either the card processor or wireless Ethernet switch can read.

The switch fabric cards utilize wireless backplane 520 for obtaining their epoch schedules, port maps, and for card management FPGA exchange. Considering switch fabric WSFC1 as exemplary, the switch fabric scheduler SFSCH1 and card management FPGA SFPGA1 exchange packets or frames with a wireless Ethernet switch WESF1. The wireless Ethernet switch WESF1 maintains communications with one or both RPMs in a manner similar to the line cards, but with a different range of slot IDs unique to the switch fabrics.

For the RPMs, each can have a first set of Ethernet addresses, based on RPM slot ID, that the RPMs use to communicate with each other. All other cards follow one of two conventions for communication with the RPMs. In one convention, each card tracks the current slot ID of the master RPM, and when the master RPM changes the slot ID, all corresponding addresses are changed. In the second convention, the master RPM (whichever slot it is in) has a set of master-RPM-designated Ethernet addresses, and the slave RPM has a set of slave-RPM-designated Ethernet addresses. When an RPM changes roles, it adopts the appropriate designated Ethernet addresses for communication to the line cards and switch fabric cards. All line cards and switch fabric cards thus do not have to switch their address set on RPM failover, or track which RPM is the current master. Although only one RPM should transmit using the master RPM addresses, both RPMs can monitor traffic to and from the other RPM.

Figure 1:
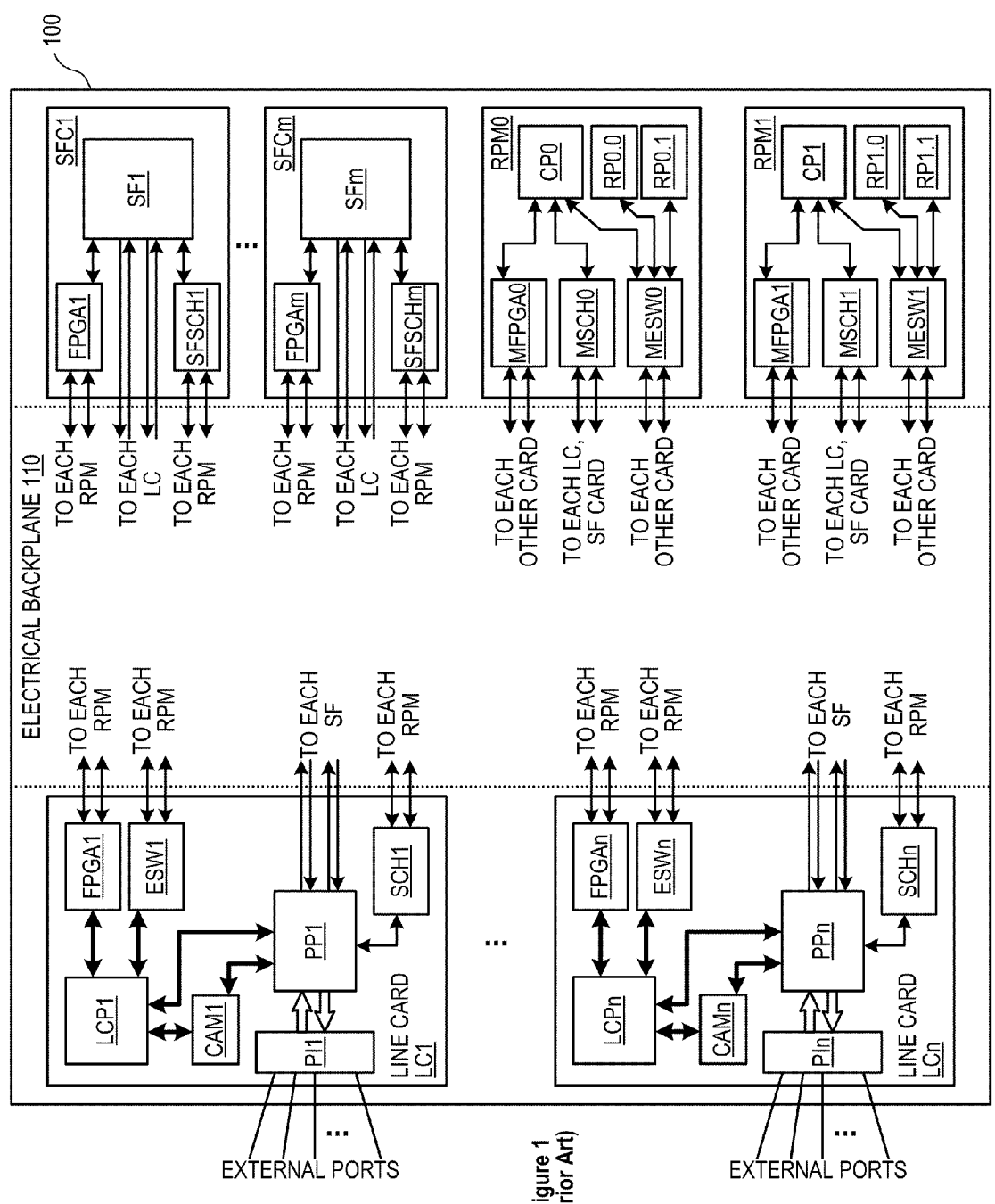
FIG. 1 contains a block diagram for a prior art packet switch.
Figure 2:
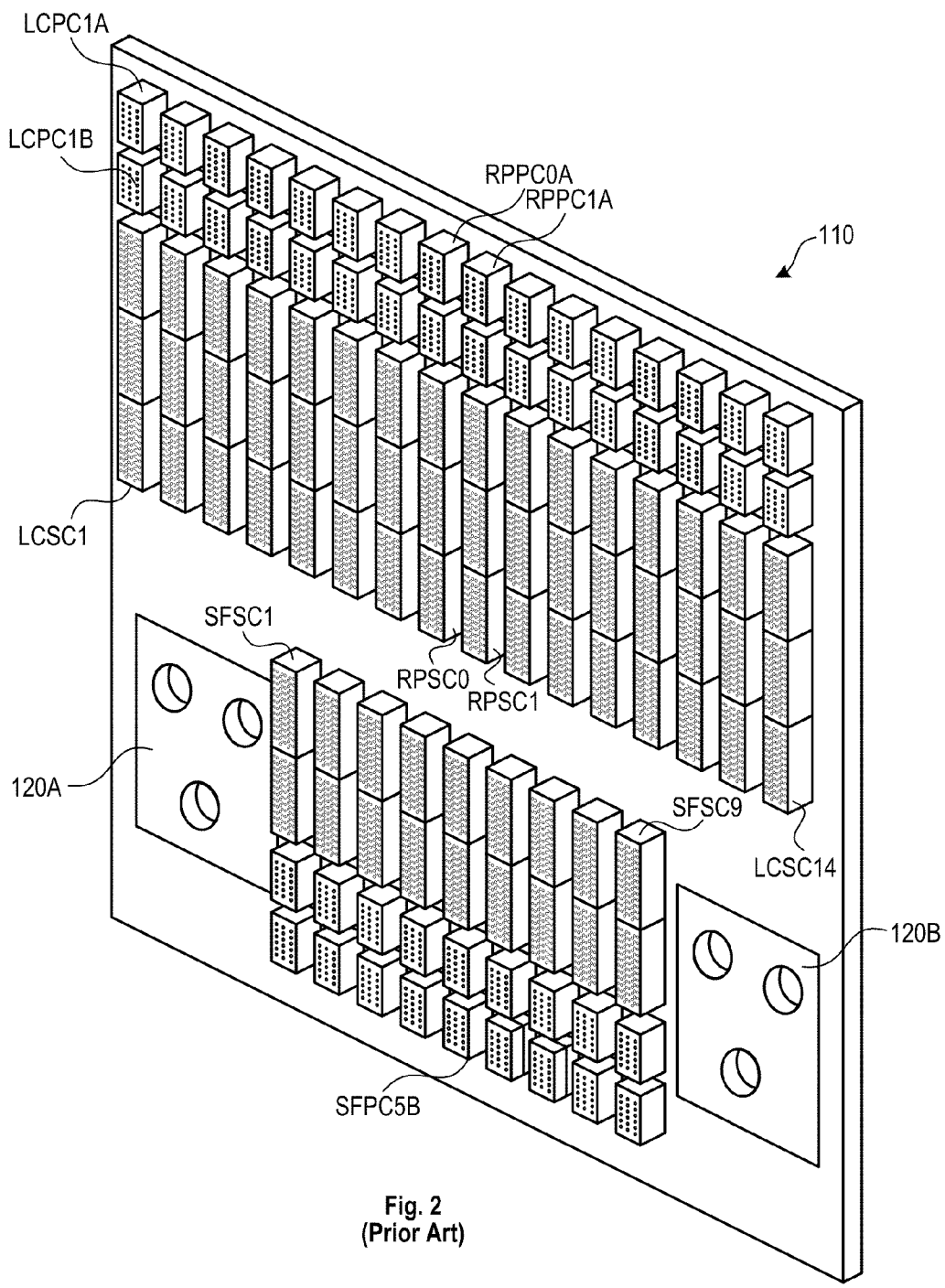
FIG. 2 illustrates, in perspective view, a prior art electrical backplane for a packet switch.
Figure 3:
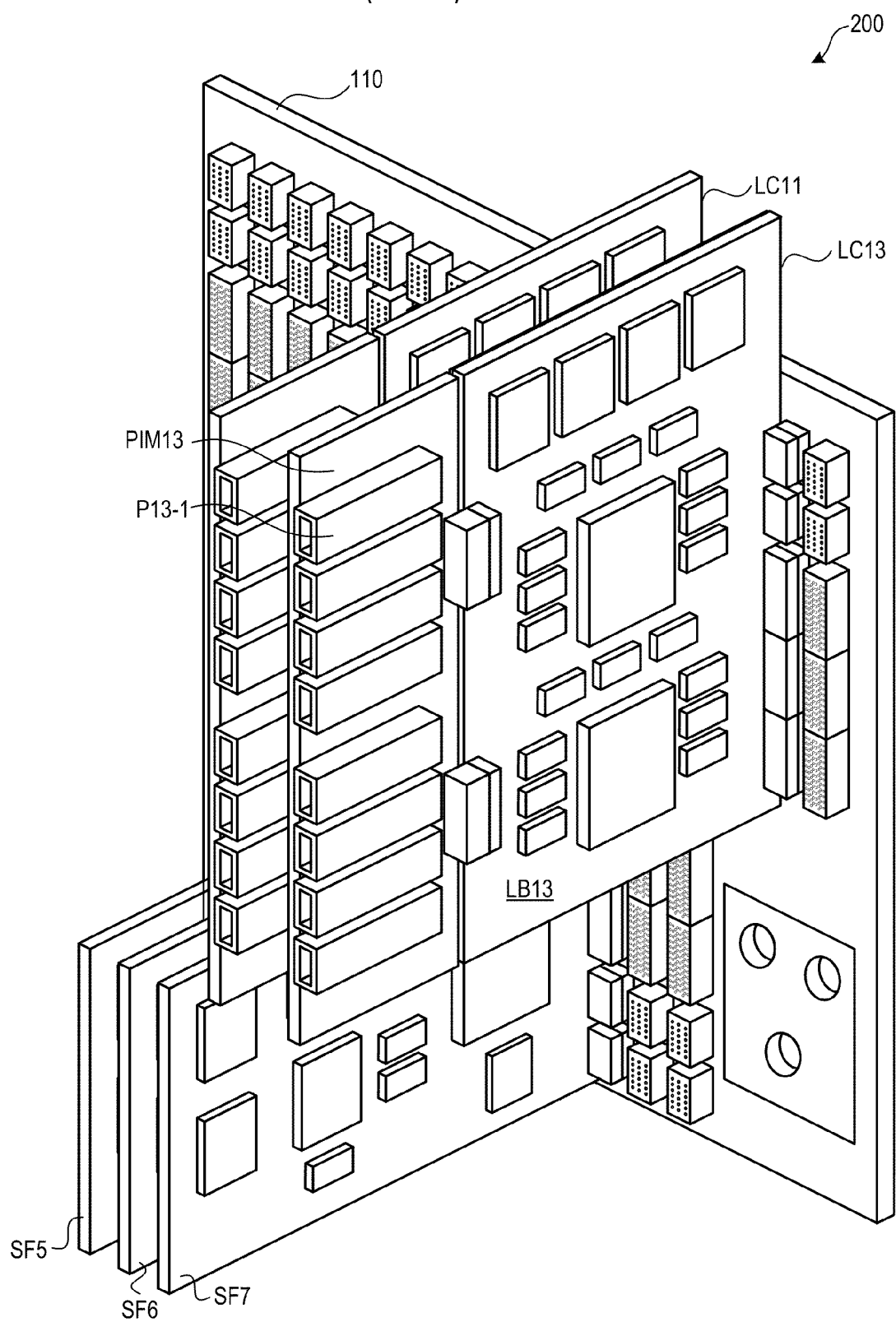
FIG. 3 shows the prior art electrical backplane of FIG. 2, partially populated with line cards and switch fabric cards.
Figure 4:
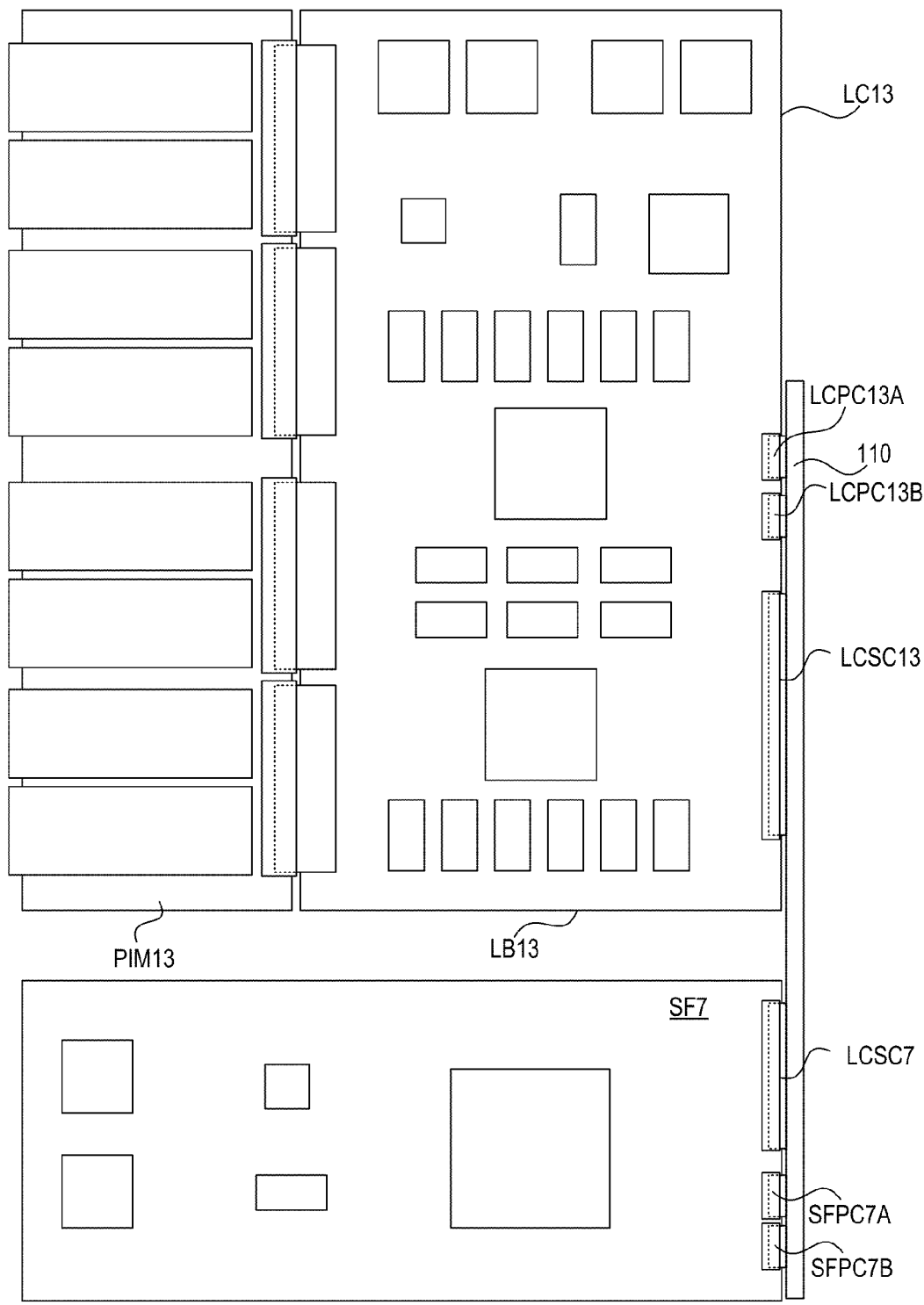
FIG. 4 shows a side view corresponding to FIG. 3.
Figure 6:
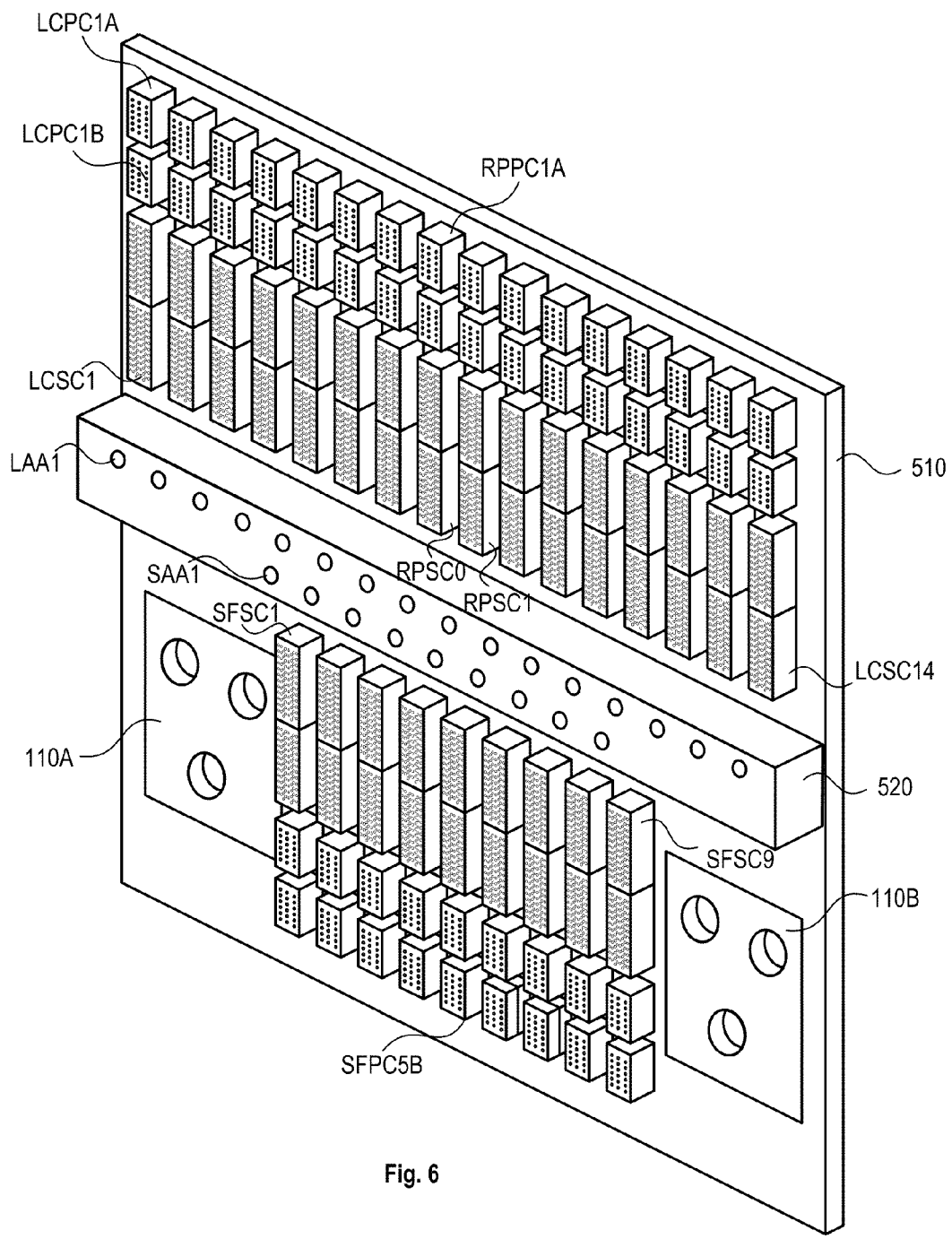
FIG. 6 illustrates, in perspective view, a combination electrical/wireless backplane according to an embodiment.

FIG. 6 shows, in perspective view, a backplane assembly according to an embodiment. The assembly comprises the electrical backplane 510, with the wireless backplane 520 mounted thereon. Electrical backplane 510 is similar in layout to electrical backplane 110 of FIG. 2, although the signal connectors (e.g., LCSC1, LCSC14, RPSC0, RPSC1, SFSC1, SFSC9) are considerably reduced in size over the FIG. 2 counterparts. It is even possible in an embodiment for the RPM card slots to be identical to the line card slots, removing the current constraints on dedicated RPM slots.

Wireless backplane 520 mounts to the midsection of electrical backplane 510, in a region freed up by the reduction in card connector size. Wireless backplane 520 comprises an enclosed waveguide, with antenna receptor apertures at each card location, the details of which will be explained below. Two of the apertures, corresponding respectively to line card slot 1 and switch fabric card slot 1, are labeled in FIG. 6 as LAA1 and SAA1. Wireless radio frequency (RF) transmissions are substantially enclosed within the waveguide.

Figure 7:
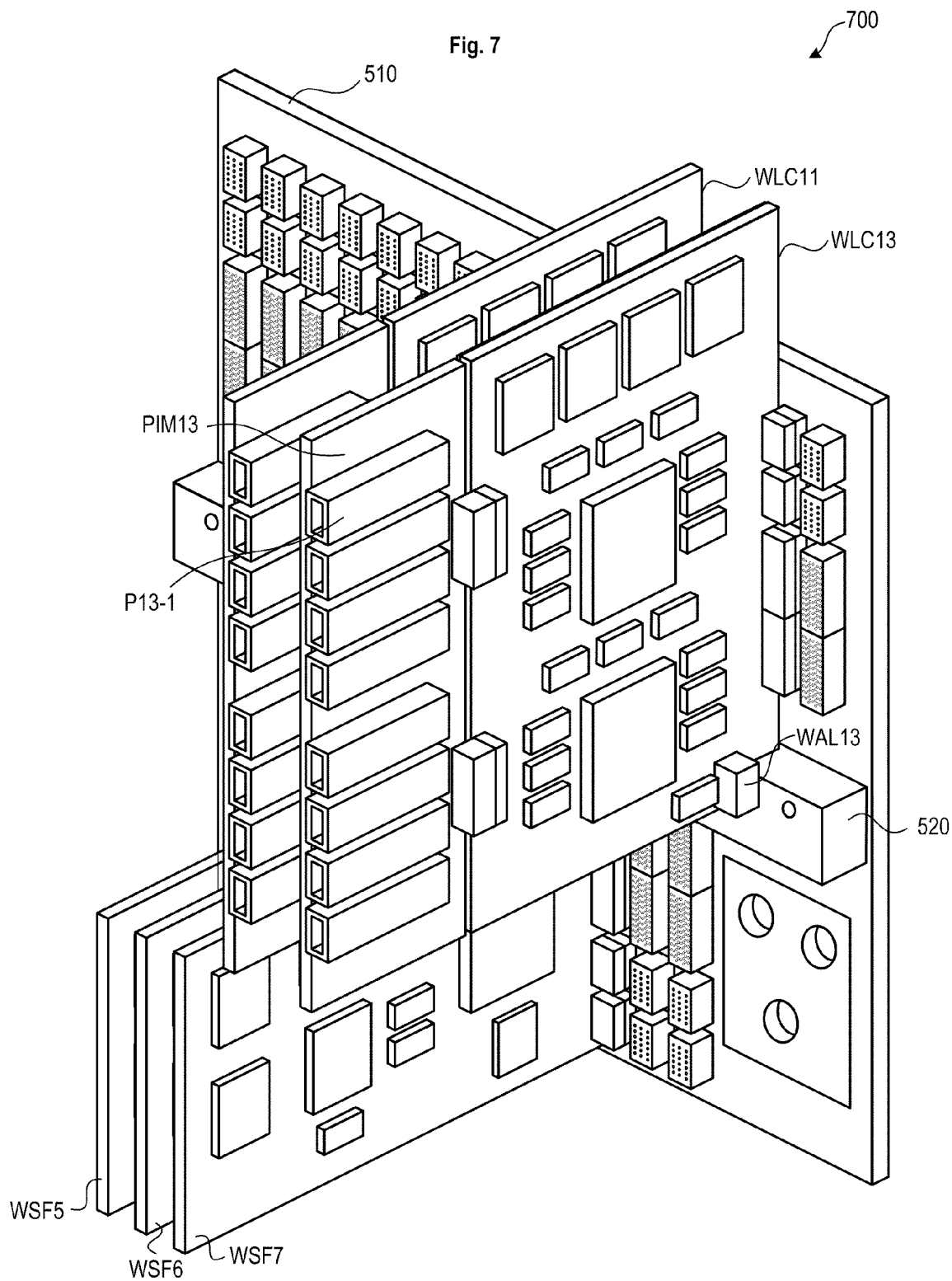
FIG. 7 shows the combination electrical/wireless backplane of FIG. 6, partially populated with line cards and switch fabric cards according to embodiments.

FIG. 7 illustrates the electronic components of a switch 700, partially populated with two wireless line cards, WLC11 and WLC13, and three wireless switch fabric cards, WSF5, WSF6, and WSF7. The cards each have an antenna section, such as wireless antenna WAL13, visible for WLC13, that engages waveguide 520 when inserted.

Figure 8:
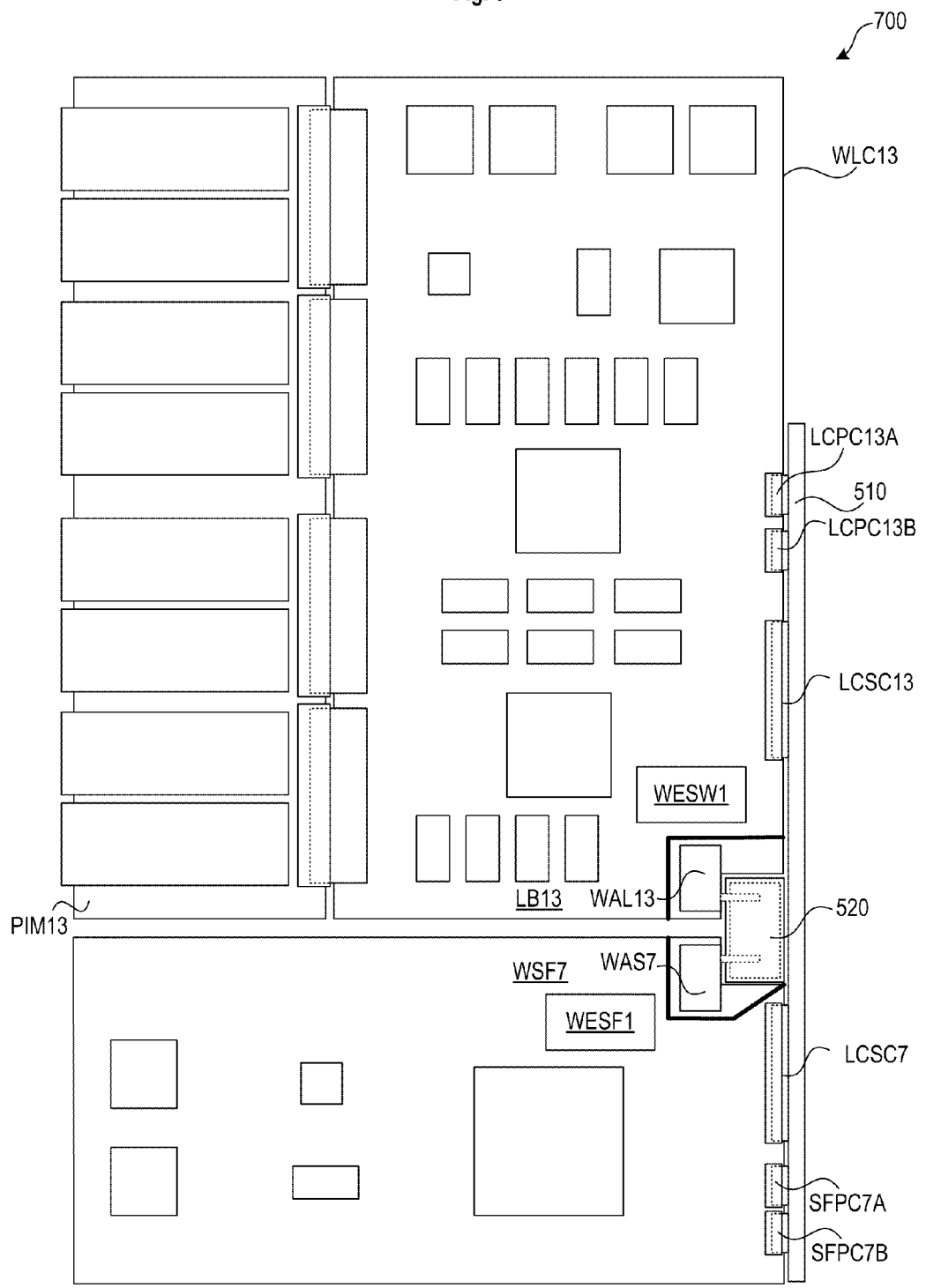
FIG. 8 shows a side view corresponding to FIG. 7.

FIG. 8 shows a side view of the backplane assembly of FIG. 7, with line card WLC13 and switch fabric card WSF7 visible. Wireless backplane 520 overlaps the bottom rear corner of line card LC13 and the top rear corner of switch fabric card WSF7. Both cards have notched cutouts to fit around the wireless backplane 520. Each card has a wireless antenna module, WAL13 on WLC13 and WAS7 on WSF7. The wireless antenna module has an antenna that projects through the antenna receptor aperture at that card slot on the wireless backplane 520 when the card is inserted.

Figure 9:
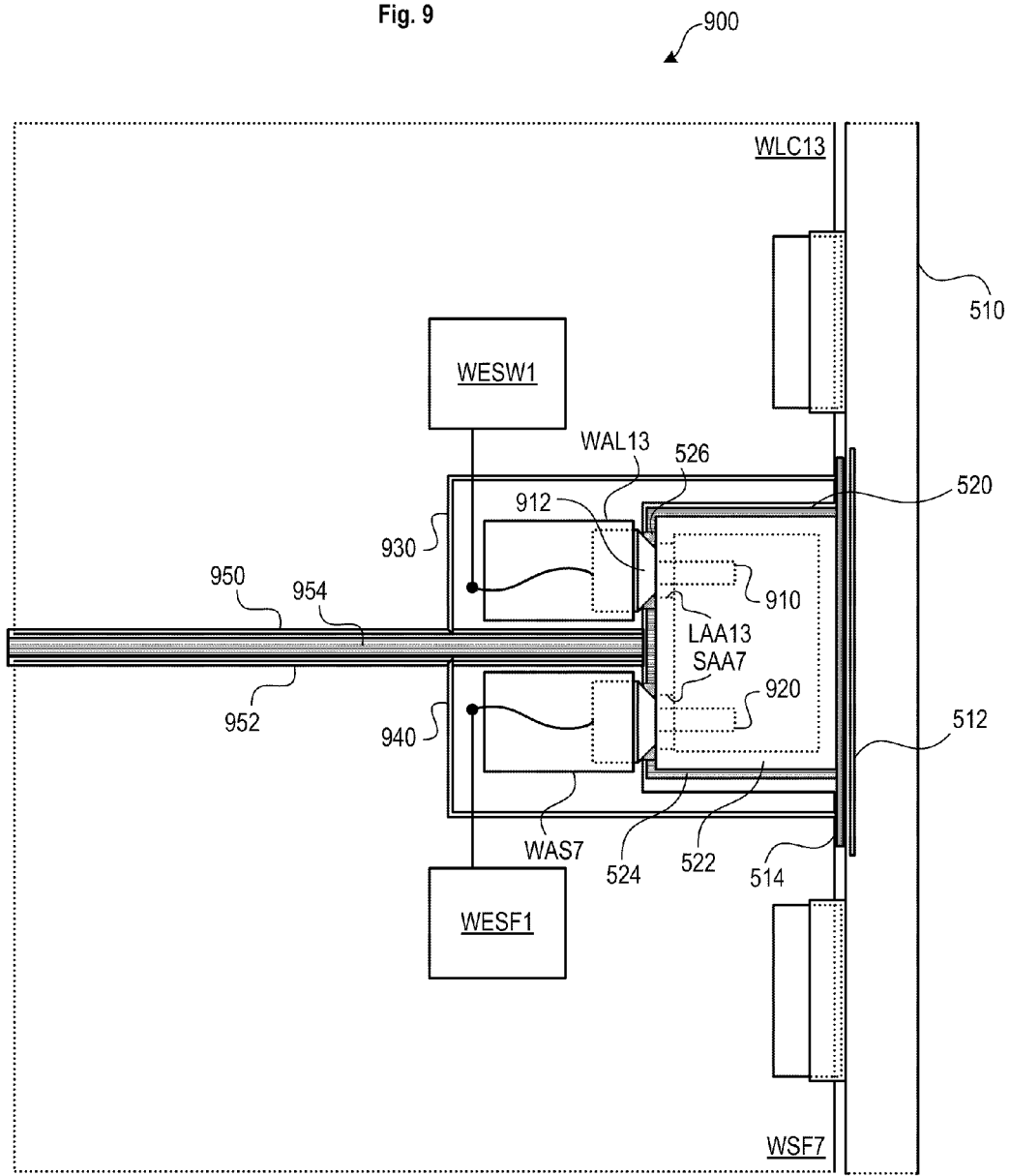
FIG. 9 shows detail of the wireless region of FIG. 8.

FIG. 9 shows detail 900 of the wireless region of the FIG. 8 backplane assembly, revealing specific features used to control RF energy from the wireless backplane. Generally, it is preferable to isolate EMI within separate chambers to prevent summing of EMI energy, which could create locally strong interference that degrades system performance. Within electrical backplane 510, a continuous digital ground plane 512 is placed on one or more of the interior conductive layers, preferably the layer nearest the backplane 510 surface to which wireless backplane 520 mounts. Ground plane 512 covers the extent of the area over which wireless backplane 520 mounts, and extends slightly therefrom, to aid RF isolation of the electrical and wireless backplanes. An overlying dielectric region, which can be the outer dielectric region of backplane 510, as shown, or an additional dielectric applied to the outer surface of backplane 510, provides a non-conductive barrier between ground plane 512 and the overlying structure. In one embodiment, the dielectric region is designed for high loss, with a dielectric constant in excess of 4.5.

Figure 10:
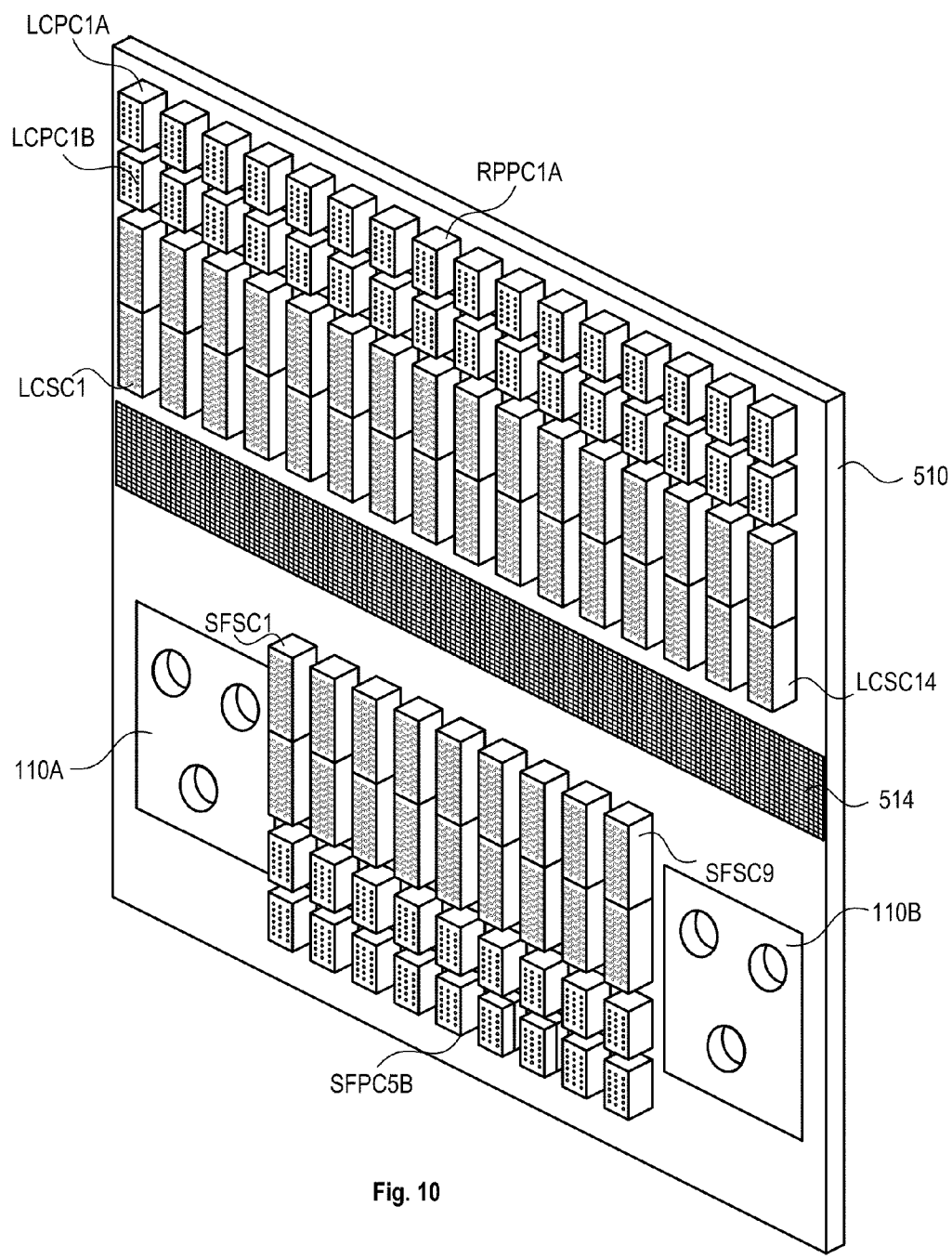
FIG. 10 shows the combination electrical/wireless backplane of FIG. 6, with the wireless waveguide removed.

A tuned chassis ground plane 514 attaches to the outer surface of backplane 510 over ground plane 512. Chassis ground plane 514 can be formed, e.g., of a conductive crosshatch material with appropriate crosshatch spacing to dampen the wireless carrier frequency employed in the chassis. In the perspective view of FIG. 10, the waveguide has been removed to reveal the position of chassis ground plane 514.

Wireless backplane 520 is formed from a conductive air waveguide 522, e.g., of rectangular cross-section. Reflection dampeners (not visible in side view, but shown in FIG. 12 elements 1230, 1240) placed at each end of the waveguide dampen reflections from the ends of the waveguide. A ferromagnetic composite material 524 is placed on the outer surfaces of waveguide 522. The ferromagnetic composite material provides penetration loss for unwanted radiation passing either into or out of the waveguide, at RF frequencies up to 4 GHz. Beyond 4 GHz, waveguide 522 provides shielding for the wireless backplane.

In order to couple RF signals between each card and the waveguide, each card must be provided with an antenna. In the FIG. 9 embodiment, each card contains its own antenna assembly, e.g., WAL13 on WLC13 and WAS7 on WSF7. Apertures in waveguide 522 allow each card's antenna to project into the interior of the waveguide when the card is inserted into the chassis. For instance, antenna assembly WAL13 contains an antenna 910 that projects through waveguide 522 aperture LAA13 when card WLC13 is fully seated in the chassis; antenna assembly WAS7 contains an antenna 920 that projects through waveguide aperture SAA7 when card WSF7 is fully seated in the chassis. The aperture can be drilled slightly larger than the antenna to provide some alignment tolerance.

An EMC (electromagnetic containment) seal or gasket surrounds each aperture in waveguide 522, such as EMC seal 526 shown at waveguide aperture LAA13. The antenna assembly WAL13 contains a seal mating surface 912. When card WLC13 is fully seated in the chassis, seal mating surface 912 compresses EMC seal 526, providing EMC at the antenna insertion point. The EMC seal can be designed such that it covers the aperture when no card is inserted. Alternately, a dummy card for use in a blank slot can have a seal mating surface (but no antenna) to provide the EMC function.

Other chassis and card features also serve to provide an EMC function. Preferably, the wireless transceiver (in FIG. 9 part of the antenna assembly) and antenna are contained in a corner of each card that is covered with a shield to further isolate the wireless frequencies within the wireless portion of the devices. Shields 930 and 940, shown respectively on cards WLC13 and WSF7, includes a wall surrounding the wireless plane region of the card. The wall may also be capped to form a sealed enclosure except for an opening for the antenna. The enclosure wall can provide a sealing surface against the aperture EMC seal in a given embodiment.

Chassis edge guides 950, 952 provide alignment and support for the card carriers. As cooling air must be forced past the cards during operation, the edge guides cannot be placed on a solid bulkhead. Instead, edge guides 950, 952 are rails. Between the lower card bay rails and the upper card bay rails, an EMI cage filter 954 provides isolation between vertically adjacent cards (similar rails and cage filters lie at the opposite ends of the two card bays, as well). EMI cage filter 954 can, as shown extend fully to waveguide 522, thus also providing some isolation between the wireless planes of the vertically adjacent cards.

Several alternatives exist for deploying each card's antenna within the waveguide. In perhaps the simplest embodiment, the antenna is fixed, and the deformability of the EMC seal alone provides mating. Slightly more complex embodiments can spring-load the antenna, such that it makes full contact with the waveguide slightly before the card is fully seated. This ensures a more predictable deforming force against the EMC seal, and also will not allow a seal problem to prevent mating of the card's electrical connectors. One potential disadvantage of these embodiments, however, is the projection of the antenna at a card corner, making the antenna susceptible to damage when the card is removed from the chassis. Thus it may be preferable to choose an embodiment with a retractable antenna, such as the one shown in FIGS. 11A-11C.

Figure 11A:
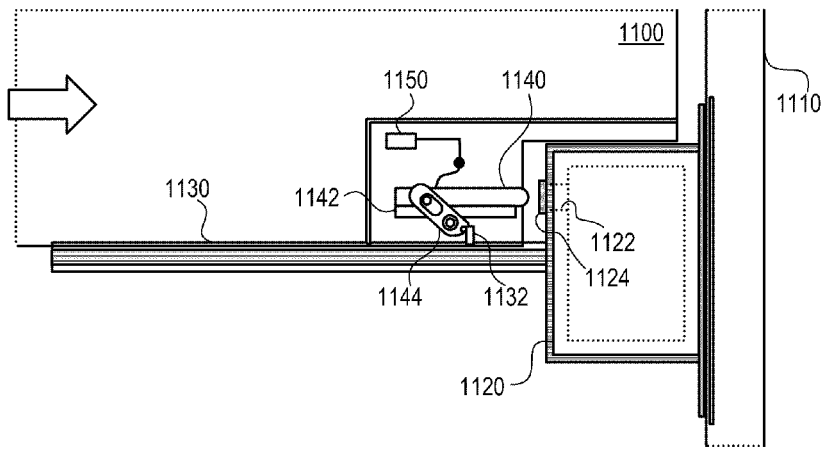
FIGS. 11A-11C show an insertion sequence for a card according to an embodiment.
Figure 11B:
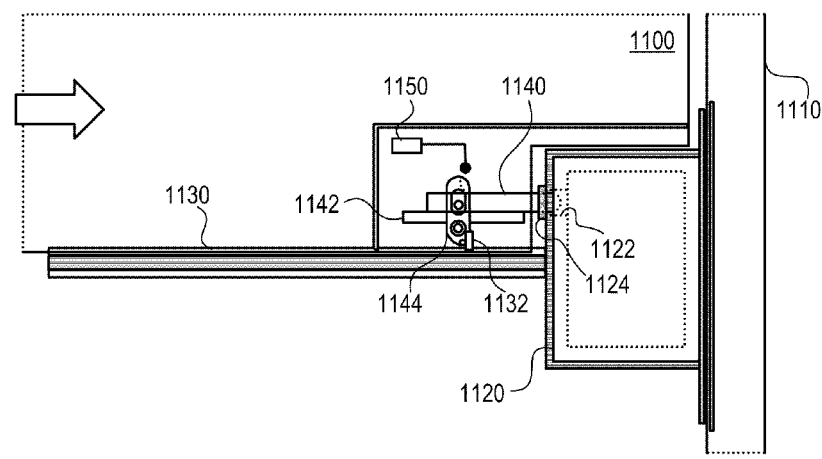
Figure 11C:
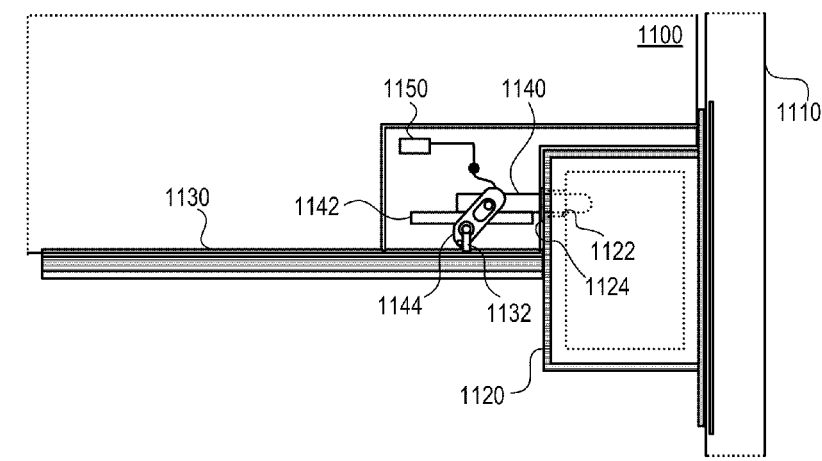

FIGS. 11A-11C show an insertion sequence for a card according to a retractable antenna embodiment. In FIG. 11A, a card 1100 is sliding along a chassis edge guide 1130 toward the eventual FIG. 11C fully inserted position against an electrical backplane 1110 and wireless backplane 1120. Wireless backplane 1120 contains an aperture 1122 with an EMC seal 1124. Card 1100 contains a retractable antenna assembly 1140 electrically coupled to a wireless transceiver 1150. FIG. 11A shows retractable antenna assembly 1140 fully retracted, but just at the point where the antenna is about to deploy. The antenna slides along a rail 1142, with a position determined by the position of a spring-loaded lever 1144. Lever 1144 is positioned so at to strike a tab 1132 projecting from the side of chassis edge guide 1130, as it has just done in FIG. 11A.

In FIG. 11B, card 1100 continues to slide toward a fully seated position. Tab 1132 deflect the bottom portion of lever 1144, causing it to rotate around a mounting pin. The top portion of lever 1144 is coupled to the slidable antenna, such that the movement of the lever slides the antenna out toward the waveguide 1120.

In FIG. 11C, card 1100 is now fully seated. Lever 1144 has pushed the antenna to a fully deployed position, through EMC seal 1124 and aperture 1122 and into the waveguide cavity.

Other methods can be used to deploy a retractable antenna. For instance, the external card latch used to latch a card in place could couple through a rod or similar member to the antenna, such that the act of pushing the latch closed deploys the antenna. A non-conductive rod, or ferrite beads placed along the rod, may help avoid coupling EMI through the rod. In another method, a solenoid activates when power is supplied to the card, either because the chassis has been powered on or because during card insertion the card power connectors have mated with the backplane power connectors. The solenoid pushes the retractable antenna into the waveguide cavity. This last method is illustrated in the following embodiment.

Figure 12:
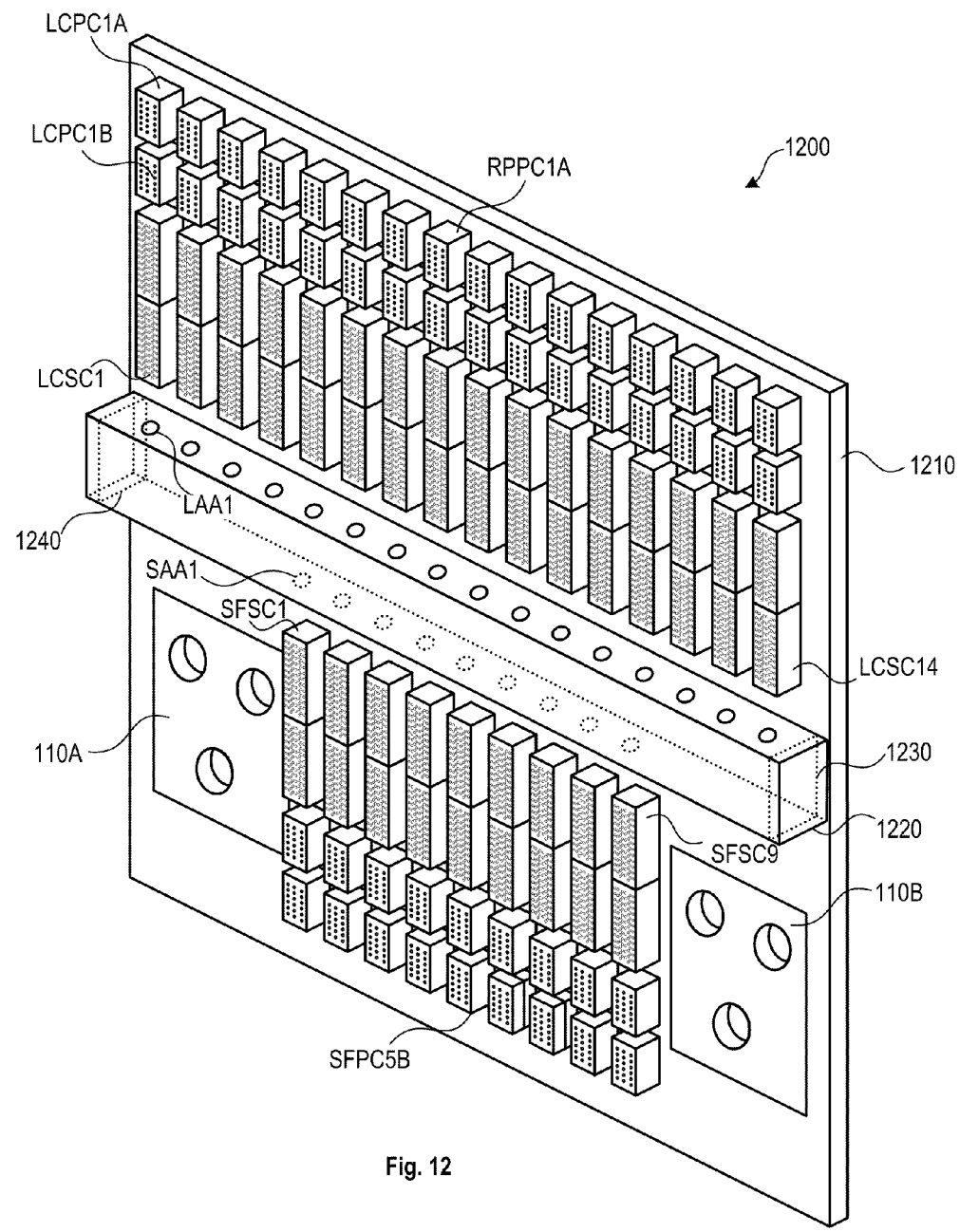
FIG. 12 illustrates, in perspective view, a combination electrical/wireless backplane according to another embodiment.

FIG. 12 illustrates, in perspective view, a combination electrical/wireless backplane assembly 1200 according to another embodiment Like the prior backplane assembly embodiment, an electrical backplane 1200 provides data plane connectivity and an attached wireless waveguide 1220 provides control plane connectivity. Wireless waveguide 1220, however, provides antenna apertures along its top and bottom surfaces instead of along its front surface. At each line card and RPM card location, a corresponding aperture (aperture LAA1 for line card slot 1 is labeled) is provided on the top surface of waveguide 1220. At each switch fabric card location, a corresponding aperture (aperture SAA1 for switch fabric slot 1 is labeled) is provided on the bottom surface of waveguide 1220.

Figure 13A:
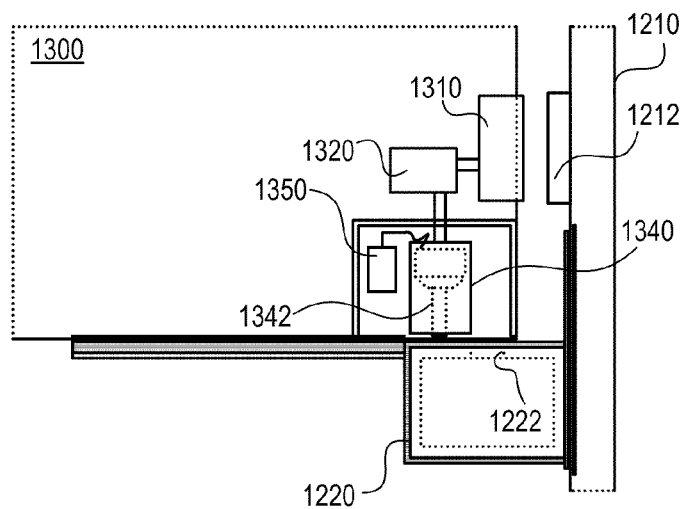
FIGS. 13A-13C show an insertion sequence for a card in the FIG. 12 embodiment.
Figure 13B:
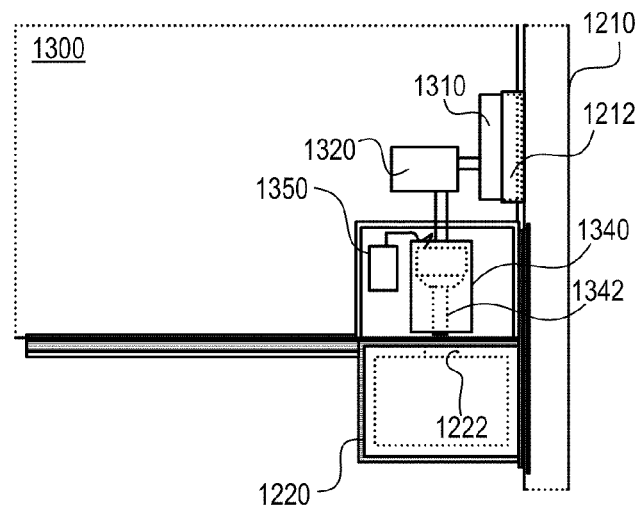
Figure 13C:
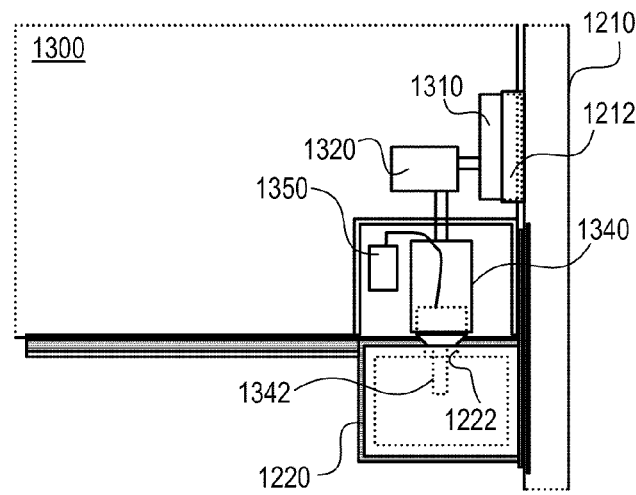

FIGS. 13A-13C show an insertion sequence for a card 1300 and the FIG. 12 waveguide embodiment. In FIG. 13A, card 1300 is shown partially inserted. An electrical connector 1310 on card 1300 is aligned for mating with a corresponding electrical connector 1212 on electrical backplane 1210. Electrical connector 1310 has pins connected to a power supply 1320, such that a DC-to-DC voltage conversion occurs when power is supplied through backplane 1210 to card 1300.

A retracted antenna 1342 is not yet aligned for mating with an aperture 1222 in the top surface of waveguide 1220. When the card is not powered, the antenna is held in a retracted position within a solenoid 1340. A flexible bonded wire electrically couples antenna 1342 to a wireless transceiver 1350.

FIG. 13B shows the card at the instant of full insertion. Power connections are made through the mated connectors 1310 and 1212, and antenna 1342 (still retracted) is now aligned over aperture 1222. In practice, the power connections may make just before the card is fully inserted. Should this be the case in a given embodiment, the aperture tolerance or shape must account for the possibility of antenna deployment at a slightly disengaged card position.

In FIG. 13C, the powered card has energized solenoid 1340, driving antenna 1342 through aperture 1222 into waveguide 1220. A seating surface on the movable antenna carrier compresses an EMC seal 1224 to prevent energy leaking out of/into waveguide 1220.

Although the prior embodiment describes the solenoid activated solely due to the supply of power to the card, other logic and/or analog switches can control solenoid operation. For instance, a switch could sense the connectivity of a short make last/break first pin in the connector. Such a switch allows activation of the solenoid potentially after the power connections make, but when the card is more nearly inserted. This switch could also advantageously rapidly retract the antenna at the first possible instant when a card is removed, avoiding the possibility of a broken antenna.

Figure 14:
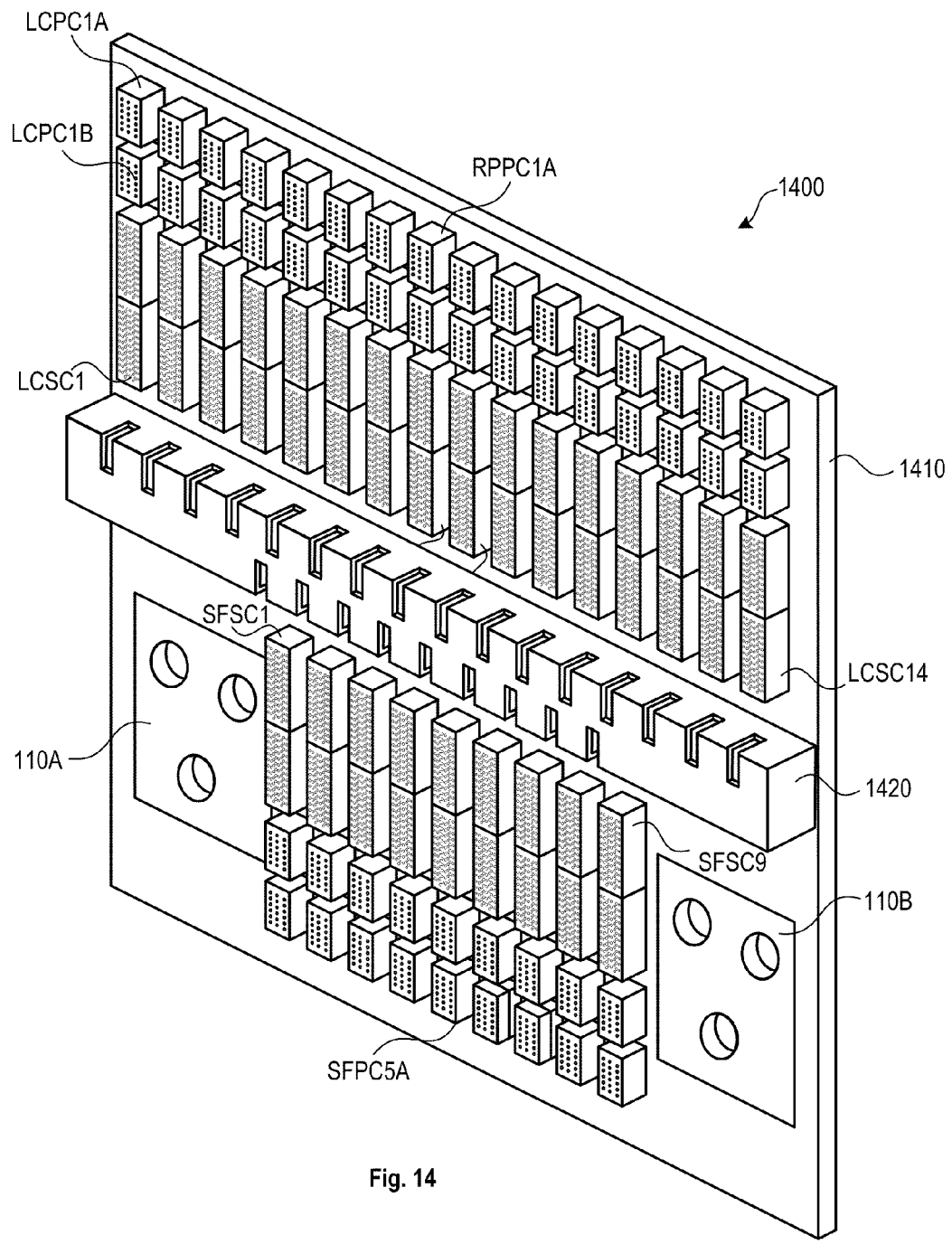
FIG. 14 illustrates, in perspective view, a combination electrical/wireless backplane according to another embodiment.

FIG. 14 illustrates, in perspective view, a combination electrical/wireless backplane 1400 according to another embodiment. Like the prior backplane embodiments, backplane 1400 uses an electrical backplane 1410 for data plane connections and a waveguide 1420 for wireless control plane connections. Instead of apertures located in a waveguide face, however, waveguide 1420 uses slots placed at the front corners of the waveguide. On the top front corner, waveguide 1420 contains a slot aperture disposed on both the front and top surfaces of the waveguide, aligned with the position of each line card and RPM card (exemplary slot LAS1, for line card 1, is labeled). On the bottom front corner, waveguide 1420 contains a slot aperture disposed on both the front and bottom surface of the waveguide, aligned with the position of each switch fabric card (exemplary slot SAS1, for switch fabric card 1, is labeled). Although not shown in FIG. 14 for clarity, waveguide 1420 employs EMC seals around each slot to prevent the leakage of electromagnetic energy into/out of the slots.

Figure 15:
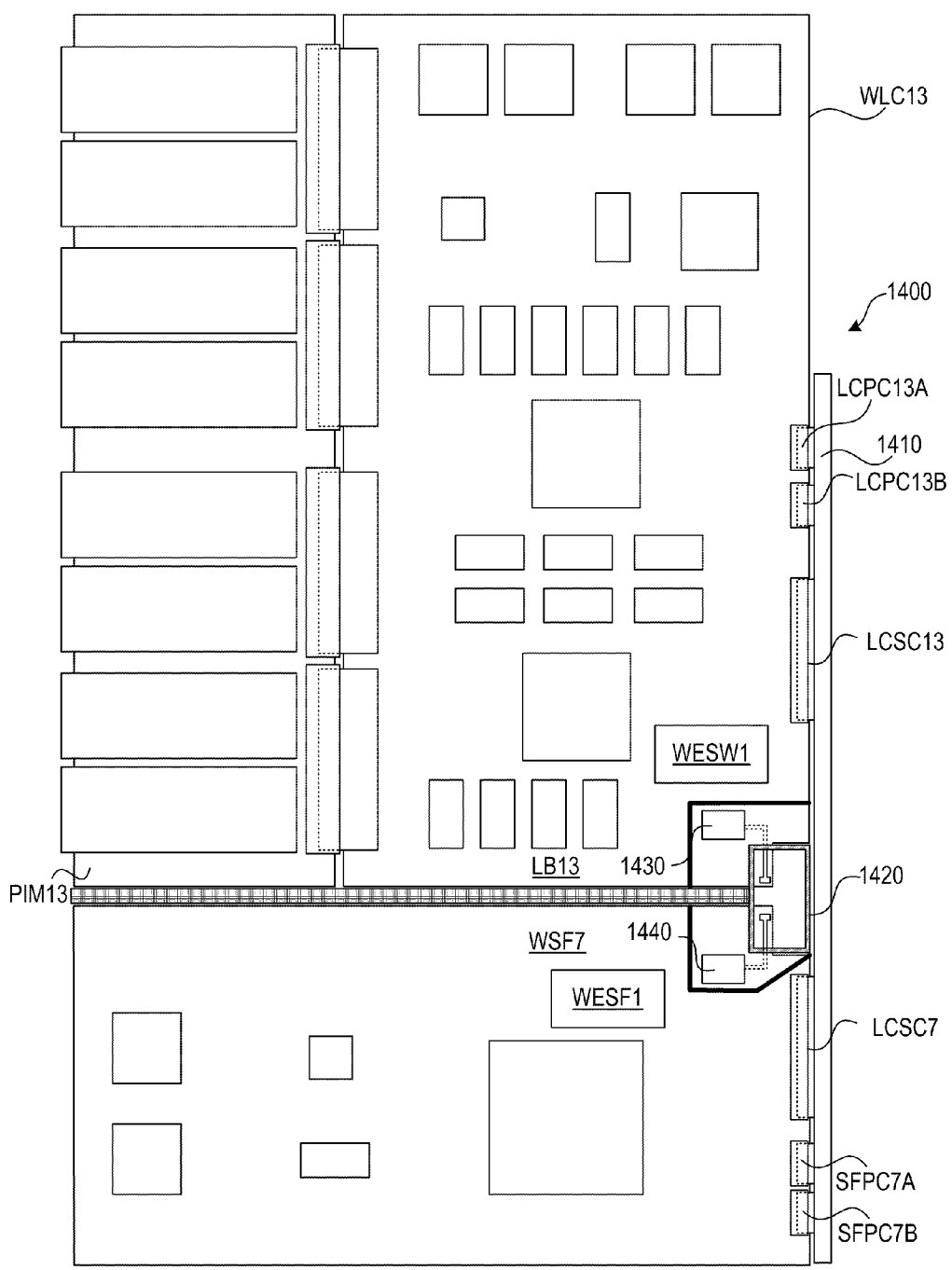
FIG. 15 shows a side view corresponding to FIG. 14.

FIG. 15 shows a side view of backplane assembly 1400, with a corresponding wireless line card WLC13 and wireless switch fabric card WSF7 inserted. Although similar in most respects to the previous line card embodiments, cards WLC13 and WSF7 contain no external antenna assemblies. Instead, the respective wireless transceivers 1430 and 1440 connect to antennas formed directly in a conductive layer of the circuit card itself. When the cards are engaged in their respective card slots, the corner of the circuit card slides directly into a slot aperture in waveguide 1420. Further details of the card construction are shown in the magnified views of FIGS. 16 and 17.

Figure 16:
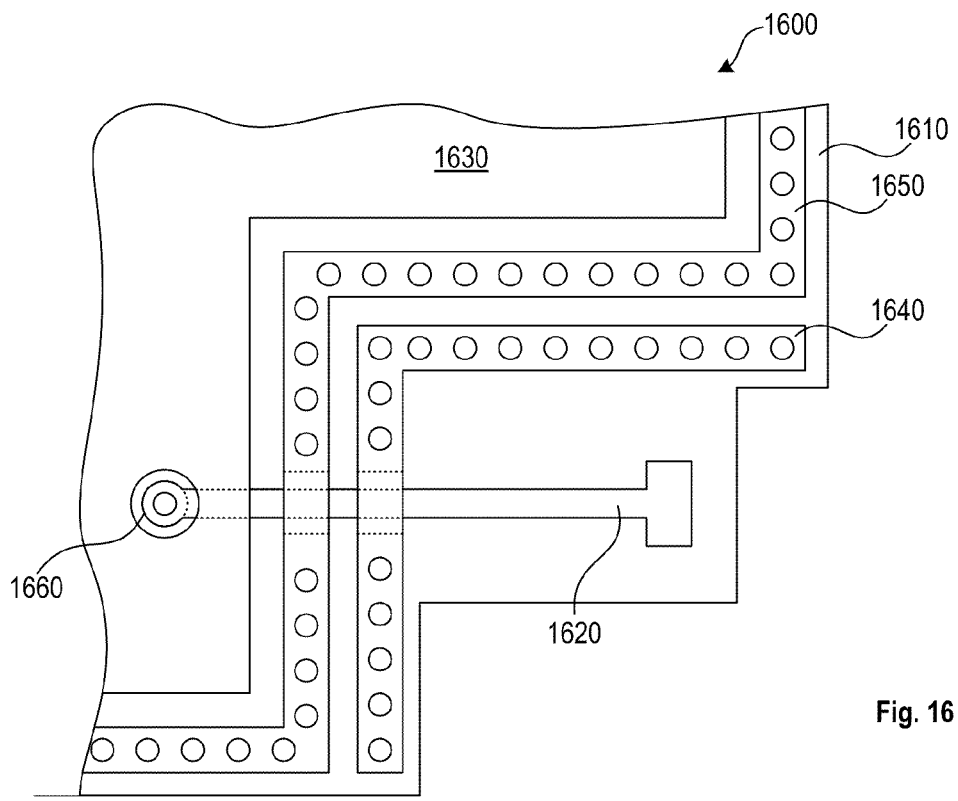
FIG. 16 illustrates, in top view, internal detail of the wireless section of a card useful with the FIG. 14 backplane.

FIG. 16 illustrates, in top view, internal detail of the corner wireless section of a card 1600, for use with the FIG. 14 backplane. The outer shape of card 1600 represents the outer extent of a dielectric material 1610 of which the card is formed. Disposed within the dielectric material 1610 are multiple conductive layers. Features on two of these layers are depicted—an antenna trace 1620 and a digital ground plane 1630. Also shown are features that are plated on the surface of card 1600—a waveguide shield 1640, a chassis guard ring 1650, and a transceiver coupling thruhole 1660.

Figure 17:
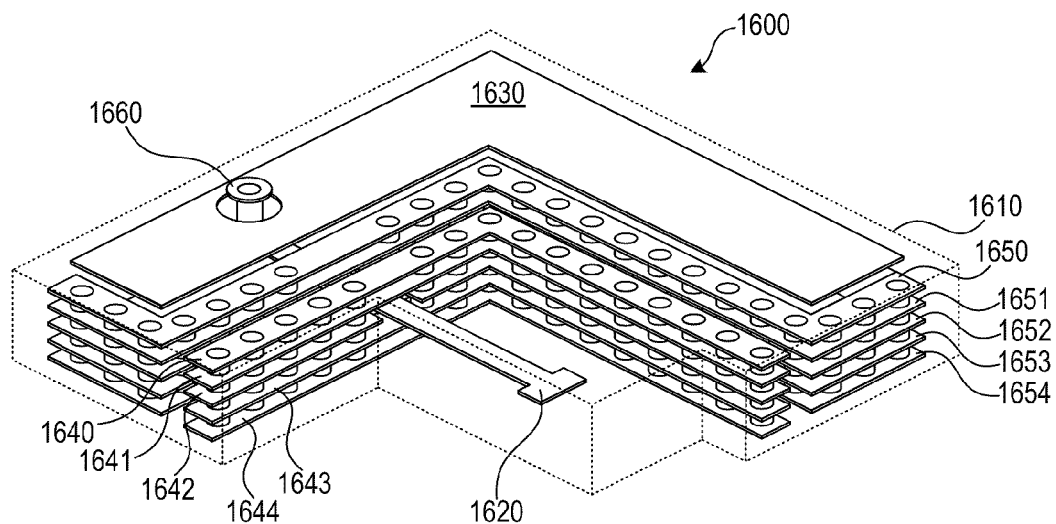
FIG. 17 shows a perspective view corresponding to FIG. 16.

Both waveguide shield 1640 and chassis guard ring 1650 are perforated with a large number of plated thruholes, the thruhole features being more clearly visible in the perspective view of FIG. 17. The plated thruholes in waveguide shield 1640 couple shield 1640 to similar shield features 1641, 1642, and 1643, formed on internal conductive layers of card 1600, and a matching plated waveguide shield 1644 formed on the backside of card 1600. Similarly, the plated thruholes in chassis guard ring 1650 couple guard ring 1650 to similar ring features 1651, 1652, and 1653, formed on internal conductive layers of card 1600, and a matching chassis guard ring 1654 formed on the backside of card 1600. The waveguide shield assembly and chassis guard ring work together to attenuate RF energy from passing through the edge of card 1600, either into or out of the waveguide.

An antenna 1620 is formed on the conductive layer containing internal waveguide shield feature 1642 and internal guard ring feature 1652. The antenna projects through gaps in features 1642 and 1652 into the corner region of board 1600. This corner region contains no other conductive features, just dielectric material. The corner region fits into a waveguide, e.g., waveguide 1420 in FIGS. 14 and 15, when card 1600 is inserted in an appropriate card slot. Although the dielectric in the corner region can be in the shape of a conventional squared-off corner, in FIGS. 16 and 17 the dielectric is more closely cut to the antenna 1620, to decrease the amount of dielectric intruding in the waveguide.

The opposite end of antenna 1620 forms a trace that ends at a plated thruhole 1660 somewhere behind the chassis guard ring. Behind the chassis guard ring, one or more digital ground layers 1630 flank the antenna trace on adjacent conductive layers. The plated thruhole 1660 passes through a clearance in the digital ground layers to connect to a pin or bond pad of a wireless transceiver, e.g., transceiver 1430 of FIG. 15.

Figure 18:
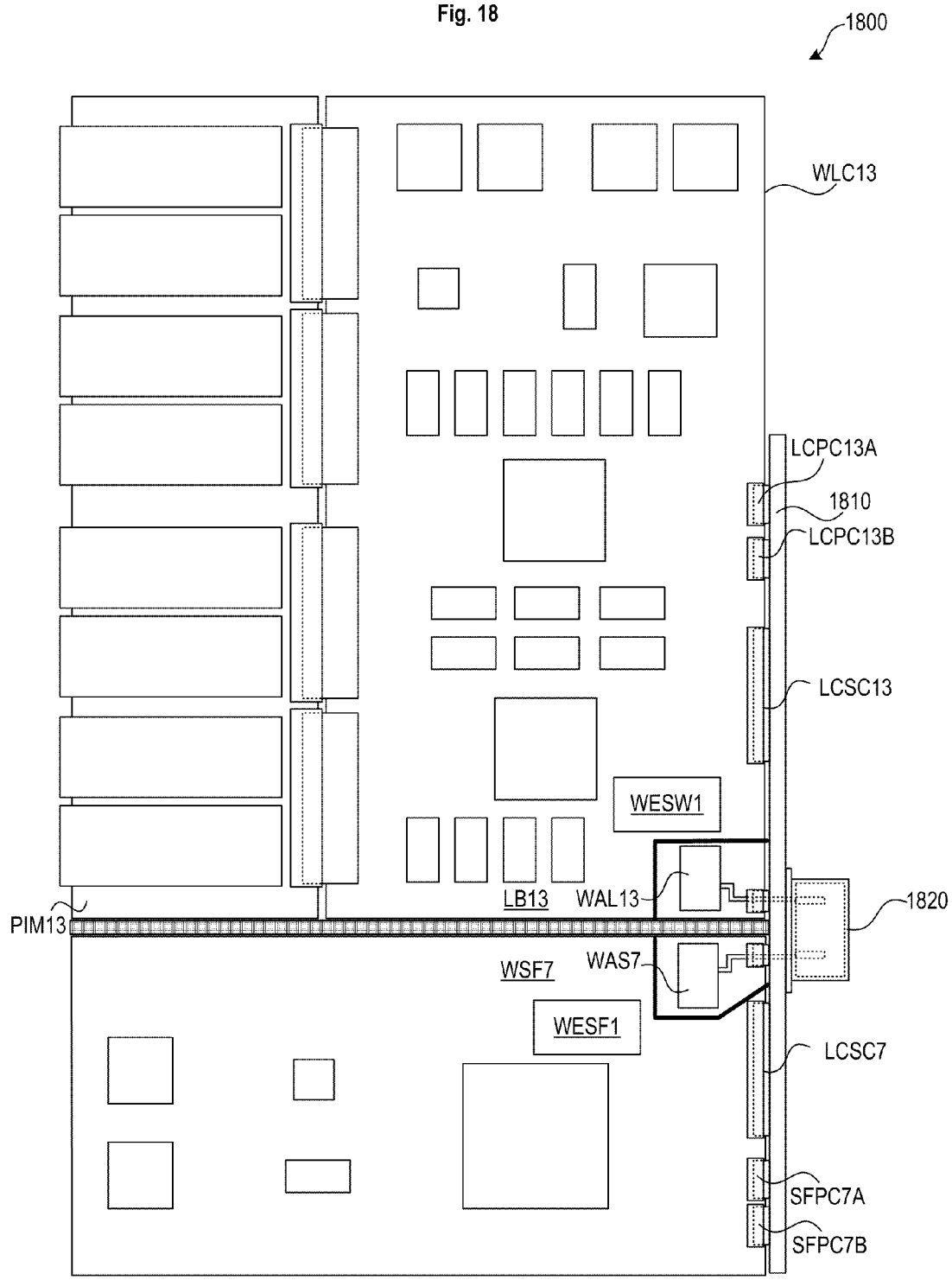
FIG. 18 shows a side view of a combination electrical/wireless backplane according to another embodiment.

FIG. 18 shows another embodiment for a wireless switch configuration 1800 according to an embodiment. In FIG. 18, a wireless backplane 1820 mounts to an electrical backplane 1810 on the side opposite from wireless line card WLC13 and wireless switch fabric card WSF7. The antennas for each card permanently mount in the waveguide, and connect through electrical backplane 1810 to antenna connectors.

Figure 19:
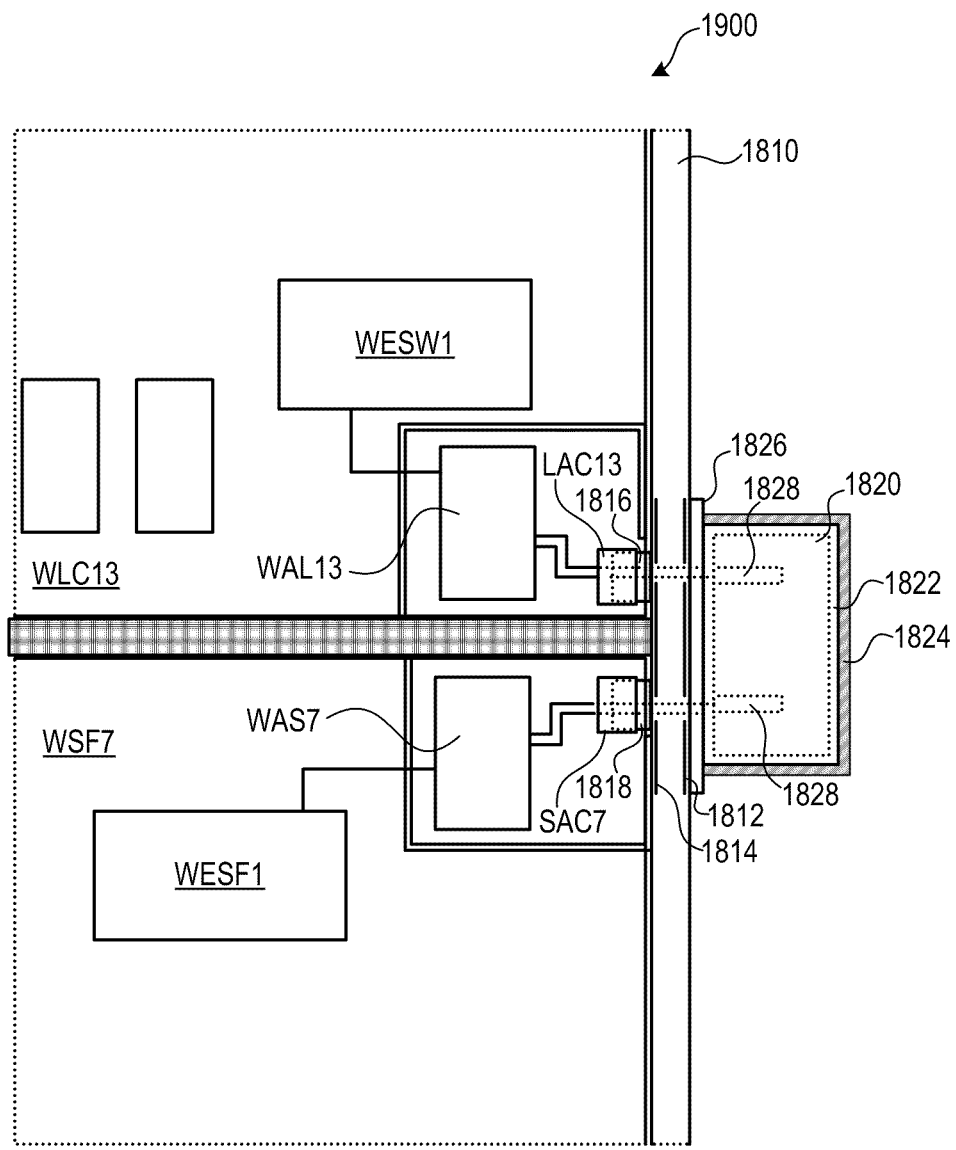
FIG. 19 shows an enlarged view of the wireless section of FIG. 18.

FIG. 19 shows a closeup view 1900 of the wireless section of wireless switch configuration 1800, including sections of electrical backplane 1810, wireless line card WLC13 and wireless switch fabric card WSF7, and wireless backplane 1820. The shell construction of wireless backplane is similar to those described previously: a conductive (preferably metallic) rectangular air waveguide 1822, with a ferromagnetic composite covering 1824, and a chassis ground crosshatch layer 1826 between the waveguide and electrical backplane 1810. The most significant difference for wireless backplane 1820 is that it contains no apertures, and has fixed antennas (1828, 1830 visible) for each card slot. Each fixed antenna 1828, 1830 connects through the backplane to a connector block (1816, 1818, respectively) on the front side of backplane 1810.

The antenna connections are made in one embodiment by drilling a hole large enough to pass each antenna in the assembled backplane/waveguide, and inserting an antenna/connector block subassembly into the front side of the backplane. The portion of the assembly passing through the electrical backplane is shielded to attenuate RF interference between the wireless and wired backplanes. In another embodiment, thruholes receive an antenna on the backside of the electrical backplane and a connector block on the front side of the electrical backplane. Depending on backplane thickness and connector depth, a single plated thruhole may be appropriate; otherwise, two plated thruholes connected by a trace on one of the backplane layers can be used. With the second approach, some flexibility exists to move the antenna locations for different card slots to alter waveguide characteristics.

The through-the-backplane approaches reduce the available routing space between the card ranks. Digital ground shield layers 1812, 1814 further shield the electrical backplane trace layers from the RF componentry on either side of electrical backplane 1810.

Wireless cards WLC13 and WSF7 in the FIG. 18/19 embodiment have no antenna assembly. The wireless antenna logic (WAL13 in WLC13, WAS7 in WSF7) connects through traces in the card to connector blocks LAC13, SAC7, respectively. The card connector blocks LAC13, SAC7 mate with their respective backplane connector blocks 1816, 1818 at the time of card insertion, just as the other wired connectors (e.g., FIG. 18 connectors LCPC13A, LCPC13B, LCSC13, LCSC7, SFPC7a, SFPC7b) mate.

Figure 20:
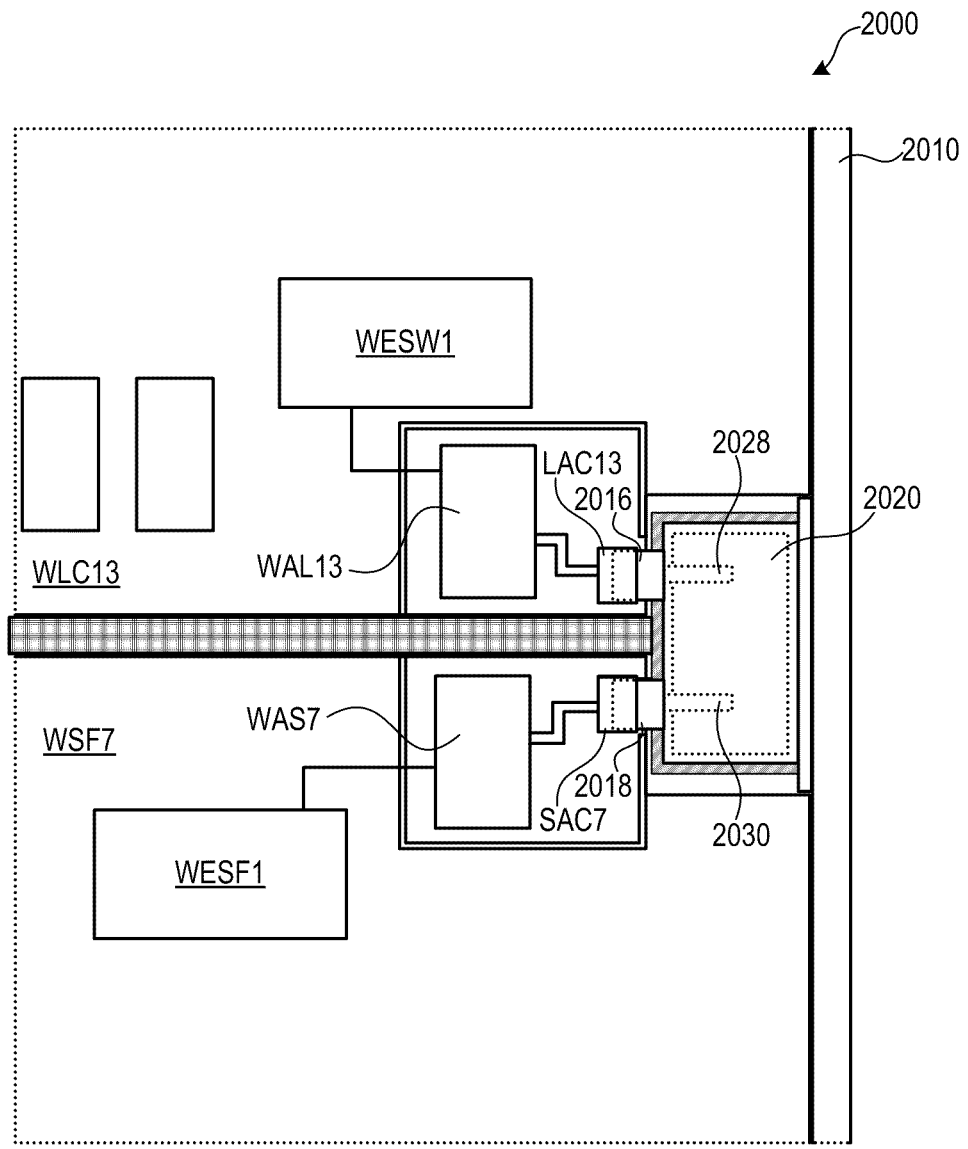
FIG. 20 shows a similar enlarged view as FIG. 19, for a different waveguide configuration.

FIG. 20 contains detail of a wireless section 2000 of a wireless switch according to another embodiment. Like the prior embodiment, the wireless cards do not contain an antenna, instead having a transceiver (WAL13 on WLC13, WAS7 on WSF7) that connects through card traces to a connector (LAC13, SAC7, respectively). A wireless backplane 2020 mounts to the front side of an electrical backplane 2010, and has permanent antennas (e.g., 2028, 2030) mounted in it. Antennas 2028, 2030 couple respectively to connector blocks 2016, 2018, which are aligned to connect respectively with connectors LAC13, SAC7.

Figure 21:
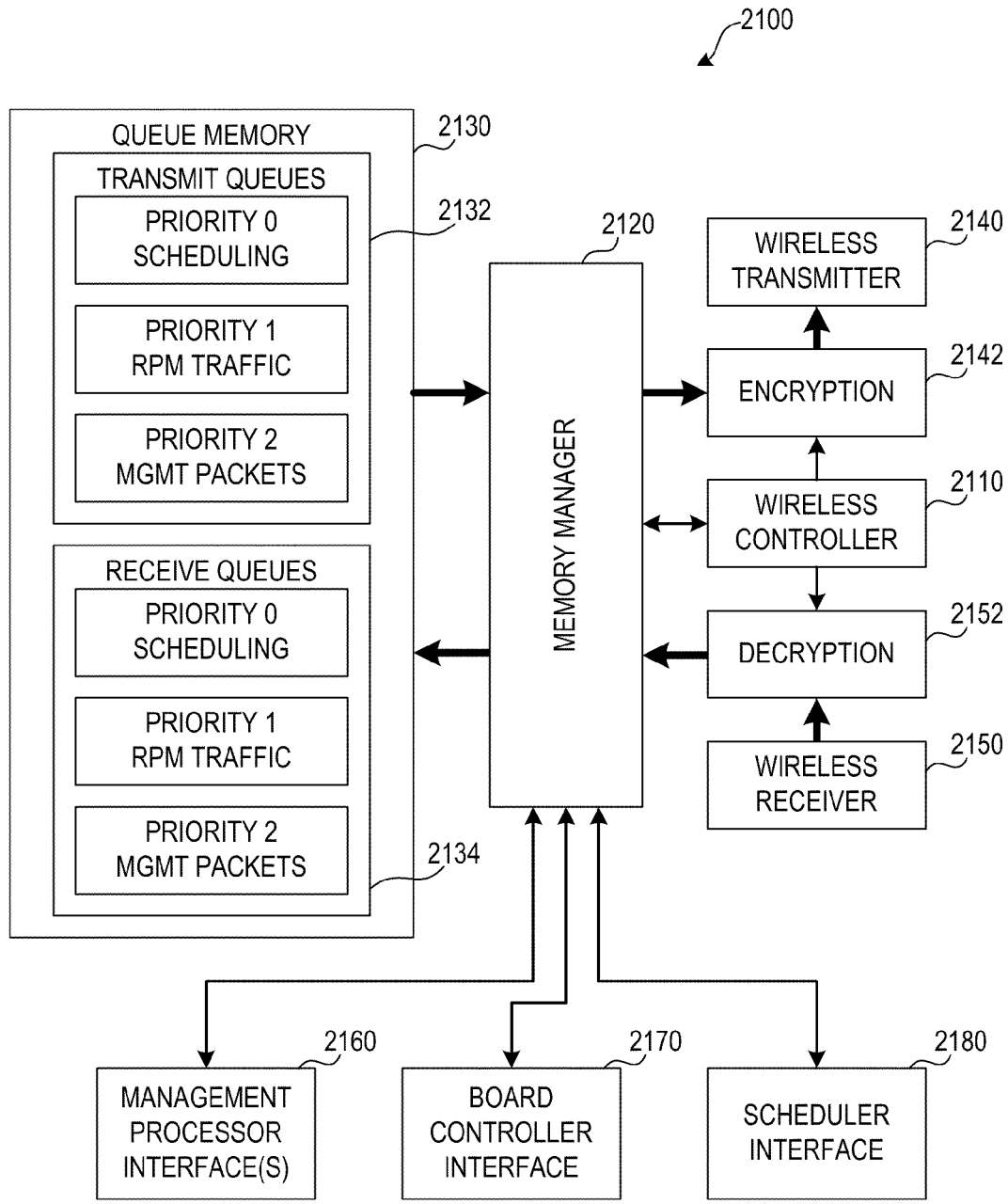
FIG. 21 contains a block diagram for the card wireless logic according to an embodiment.

FIG. 21 contains a block diagram for the card wireless circuitry 2100 according to an embodiment. Wireless circuitry 2100 comprises a wireless controller 2110, a memory manager 2120, a queue memory 2130, a wireless transmitter 2140, an encryption unit 2142, a wireless receiver 2150, a decryption unit 2152, one or more management processor interfaces 2160, a board controller interface 2170, and a scheduler interface 2180.

Wireless controller 2110 handles overall operation of the wireless subsystem. Controller 2110 receives configuration commands for enabling encryption/decryption and setting encryption keys, determining when the system is allowed to transmit, determining the wireless addresses assigned to the card, etc. Configuration commands can be received: through the board controller interface 2170, from, e.g., an onboard FPGA; through the management processor interface 2160; or from an RPM card through the wireless channel.

Memory manager 2120 distributes packets in an orderly fashion between the wireless channel and the onboard control functions that use the wireless channel. Memory manager 2120 queues packets arriving at the wireless subsystem from one of the onboard interfaces 2160, 2170, 2180 in a set of transmit priority queues 2132. Backplane traffic scheduling is the most critical type of control traffic. Memory manager 2120 thus queues packets arriving from scheduler interface 2180 in a priority 0 queue. When wireless controller 2100 is allowed to transmit, memory manager 2120 will first dequeue any packets in the priority 0 transmit queue and submit those packets for encryption and transmission.

In this example, router management traffic is deemed more urgent than chassis management traffic. Memory manager 2120 queues packets received from the management processor interface 2160 in a priority 1 transmit queue, and queues packets received from the board controller interface 2170 in a priority 2 transmit queue. The memory manager will not select packets from either the priority 1 or priority 2 transmit queues as long as a packet exists in the priority 0 transmit queue. Assuming that the priority 0 transmit queue is empty, however, memory manager can then use strict priority, weighted round-robin, or any other appropriate scheme to arbitrate between the priority 1 and priority 2 queues. The number of queues is merely exemplary, with arrangement with more or less queues possible. For instances, a lower-priority statistical and/or logging queue could also exist, with the management processor responsible for specifying (e.g., by Ethernet address) to which queue its packets belong.

Memory manager 2120 also receives wireless packets from wireless receiver 2150, through decryption unit 2152. The wireless receiver can perform filtering to reject packets not addressed to any valid address on the card, or memory manager 2120 can perform this function. Memory manager 2120 stores valid packets in receive queues 2134, e.g., of similar priority classification as that described above for the transmit queues. As the memory manager 2120 has bandwidth and the appropriate interface 2160, 2170, and 2180 is ready to receive, memory manager 2120 dequeues received packets and forwards them out the appropriate interface.

In a given embodiment, the master RPM can also use the wireless channel to signal SOE (start of epoch) for the switch fabric, instead of using dedicated traces on the backplane. In one embodiment, the master RPM forces all wireless transmitters to a silent state a given time period prior to the next SOE. The mechanism for forcing silence can be, e.g., a specific broadcast instruction directed to the wireless controllers, or the controllers can be configured to automatically disable further transmission a known time period after the last SOE. The master RPM then broadcasts an SOE packet to each wireless controller at a known interval prior to the next SOE. When wireless receiver 2150 receives a broadcast SOE packet, receiver 2150 immediately signals wireless controller 2110, without submitting the broadcast SOE packet to decryption 2152 or the memory manager 2120. Wireless controller 2110 then, in a given embodiment, either signals the card's epoch timing circuitry, or signals a PLL (phase-locked loop) that maintains the epoch timing.

A RPM card wireless function generally has more management processor interfaces and receive queues, depending on the number of processors employed. Each line card processor is programmed to use different wireless transmit addresses depending on the type of control traffic sent, such that the wireless switch at the RPM card can parse the packets appropriately.

The SOE broadcast channel, when used, need not be the same channel used for other packet traffic or even a digital channel at all. For instance, in another embodiment each RPM includes a capability to transmit an SOE signal on a separate carrier frequency. The wireless receivers 2150 on the cards monitor the SOE carrier frequency for a transmitted pulse that signifies an SOE. For security purposes, the SOE channel can employ spread spectrum techniques to lessen the ability of an external malicious RF transmitter to interfere with the SOE channel.

The wireless controllers, in a given embodiment, are configured with unique transmit time slots to manage the wireless channel bandwidth. Since each card knows its position in the chassis, it can sense when the card in front of it transmits and then transmit next. For instance, at the beginning of each new SOE, the master RPM can take over the wireless channel to send switch fabric schedules, and then initiate a round robin sequence for all line cards to transmit, in a given sequence, their upcoming switch fabric requests. The master RPM can then recapture the channel to send switch management traffic, after which the master RPM initiates a second round robin sequence for all line cards to transmit, in a given sequence, switch management traffic. Assuming time remains within the current epoch, the master RPM can then recapture the channel to send chassis management traffic, after which the master RPM initiates a third round robin sequence for all line cards and switch fabric cards to transmit, in a given sequence, chassis management traffic. Other types of traffic can be handled in further rounds. Each card can be allotted a maximum amount of traffic to transmit in each of its time slots, and each round can be time-limited to ensure some time remains for each round during each epoch. Should a round end before a given card's transmit slot is reached, during the next epoch the same round can start with the next card in the sequence.

Figure 22:
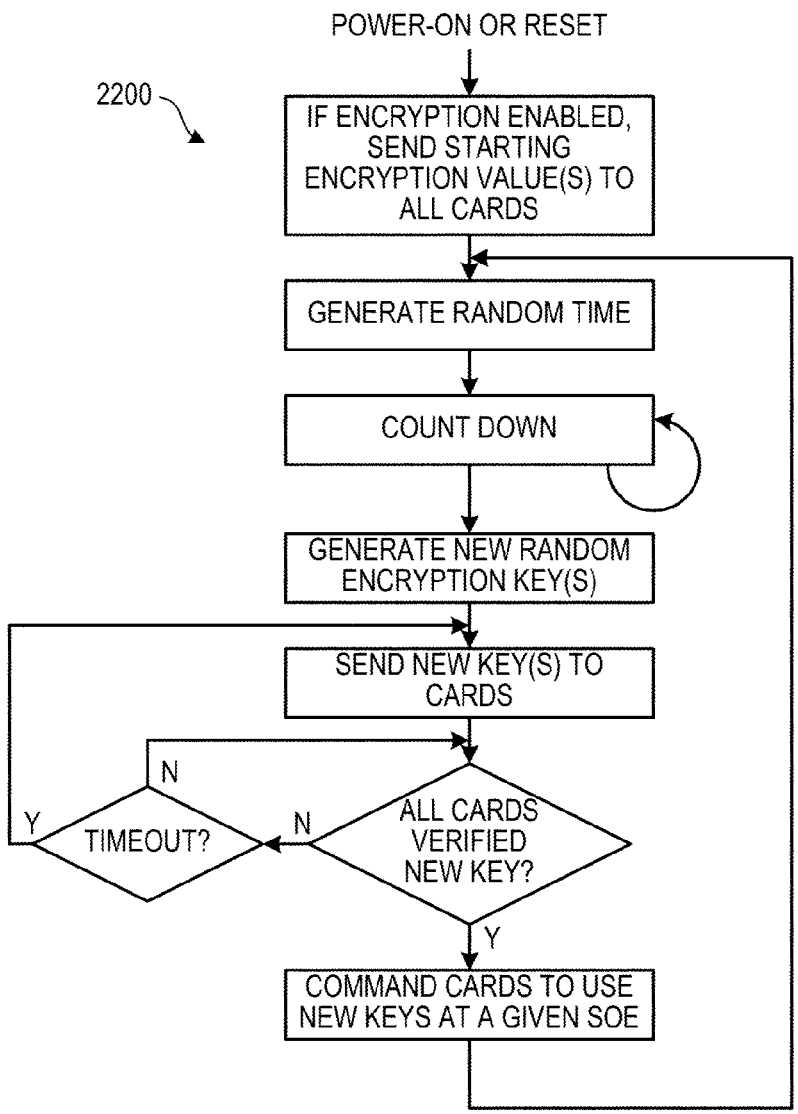
FIG. 22 shows a management card encryption sequence according to an embodiment.

In a given embodiment, the use of encryption on the wireless channel can help to secure the switch from malicious tampering and monitoring. FIG. 22 contains a flowchart 2200 for an RPM chassis encryption process. When the system first powers on or resets and encryption is enabled, and the RPM cards have switch fabric channels allocated to them on the electrical backplane, the switch fabric channels can be used to send starting encryption values to all cards in the chassis. Alternately, the starting encryption values can be sent over the wireless channel in an initialization packet. A separate, hardcoded key in each card's wireless controller can be used to decrypt the contents of the initialization packet. Each card then installs the received wireless backplane key and sends an encrypted verification packet back to the master RPM.

To further safeguard the wireless channel, the master RPM is programmed to change the encryption keys from time to time. Referring again to FIG. 22, the master RPM generates a random time, e.g., in a range of seconds or minutes, and counts down to the end of the random time. At the end of the random time, the master RPM generates new random encryption keys, and sends the new keys to the other cards. Each card sends a verification packet back to the master RPM. When the RPM has received verification back from all cards, the master RPM commands all cards to begin using the new encryption keys at a given epoch. Should not all cards verify receipt of the new key, the process times out and new keys are sent again. Optionally, a card that repeatedly prevents key changeover can be taken out of service or rebooted.

It is remotely possible that for some reason a given card may lose synchronization with the current encryption sequence. Further, a new card can be inserted in a running chassis, with no knowledge of the current encryption keys. During each epoch in which wireless transmitters from one or more card slots are not heard from, the master RPM can initiate a time slot for unencrypted synchronization requests. Card that are new or lose synchronization can request the current encryption keys, which are then sent to that card in a manner similar to the power-on sequence. The master RPM may require some sort of verification of the card's identity before sending keys. The master RPM can also request that the card enable its switch fabric transmitters and verify with the corresponding switch fabric receivers that a card exists in the reported slot.

Figure 23:
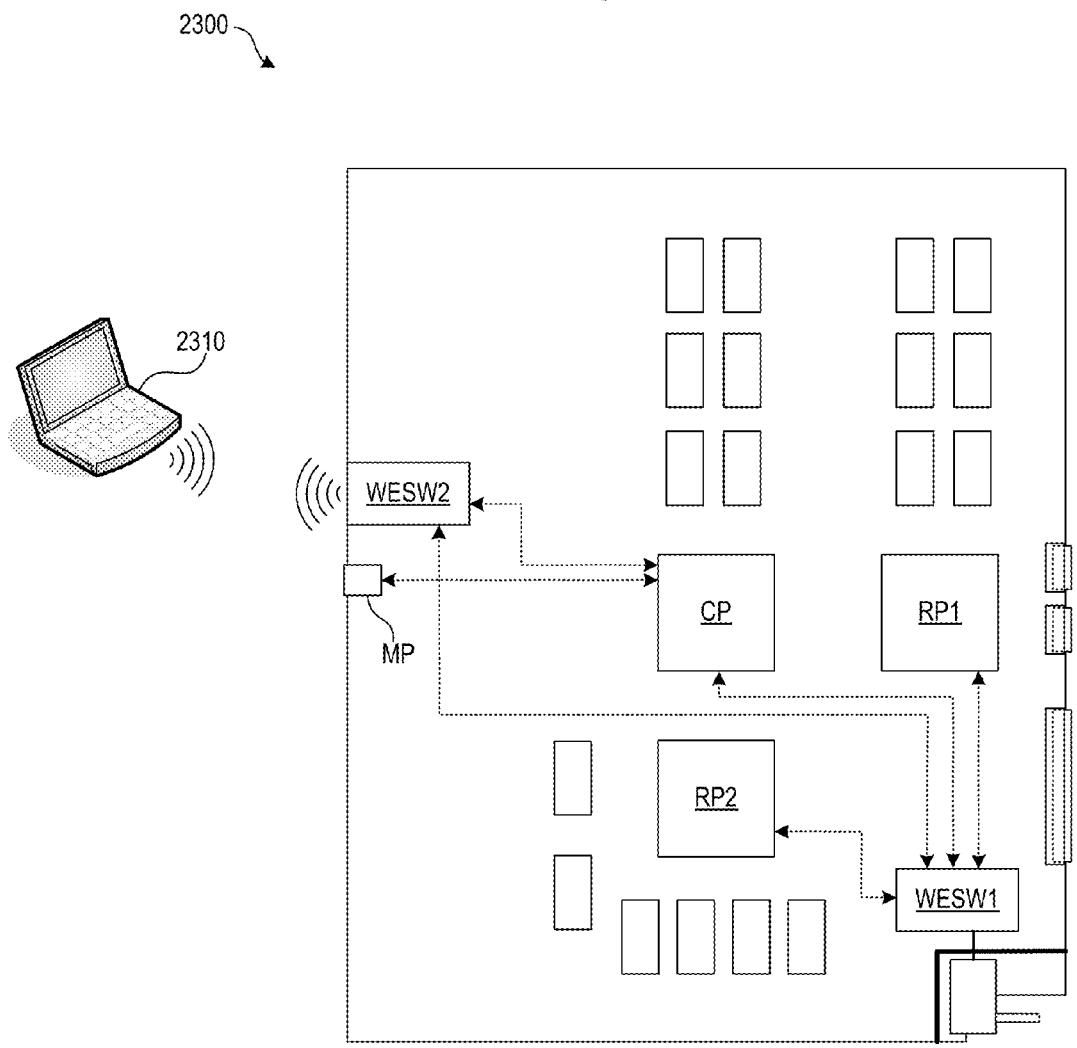
FIG. 23 contains a block diagram for a management card comprising a wireless monitor repeater.

FIG. 23 contains a block diagram for a management card with a wireless monitor repeater function. Prior art RPM cards have a management port that allows a user to connect a switch to a management terminal or network. Wireless RPM card WRPM0 also has such a port, labeled MP, which communicates with the RPM card's control processor CP. Software running on processor CP allows an administrator to perform various switch and chassis management tasks.

Wireless RPM card also has a wireless switch WESW2 that, when enabled, transmits and receives external to the switch chassis in a defined region in front of card WRPM0. This allows WESW2 to communicate with a network management device such as laptop 2310, when laptop 2310 is in close proximity to the switch chassis. Standard IEEE 802.11-compliant wireless channels and security can be used for WESW2.

In one embodiment, an administrator with the appropriate passwords initiates a secure channel between laptop 2310 and WESW2. The administrator then accesses a login application on processor CP to request visibility to wireless backplane traffic. When the login is successful, processor CP instructs wireless switch WESW1 to mirror all wireless backplane traffic to wireless switch WESW2. WESW2 forwards the mirrored traffic over its wireless channel to laptop 2310. The resulting visibility into the actual control traffic— of all types—seen by the chassis can provide invaluable for debugging, system administration, and network administration. By communicating with the slave RPM, laptop 2310 can also see received copies of all wireless packets sent by the master RPM. Although a wireless switch is shown, a wired Ethernet port connected directly to a mirroring port on WESW1 can also be substituted for WESW2.

Optionally, an authenticated management system 2310 can be allowed to communicate using WESW1 with other cards in the chassis to configure those cards, see configuration register values, request statistics, or even request mirroring of traffic (bandwidth permitting) from a card to system 2310 using the backplane control channel. A separate priority queue system and wireless address can be allocated to management from an external source.

A few embodiments, including those presently preferred for implementation, have been presented above. Many other designs may prove workable, or even equally valuable. Optical visible light or infrared wireless backplanes are one such possibility for appropriate implementations. For RF-wireless systems, existing wireless technology, such as an IEEE 802.11 variant, can provide the framework supporting the specific backplane protocols. Different transmit channels with different carriers can be used by the master RPM and by the rest of the cards in the system. Spread-spectrum coding, with each card having its own unique chip sequence, can be considered in order to allow simultaneous transmission by multiple cards on the same carrier, should the bandwidth requirements exceed those available on a single time-shared channel.

Although some reflection and wave propagation controls have been described, those skilled in the waveguide art will recognize that the configuration of a given chassis may dictate the use of situation-specific waveguide techniques. The master (or slave) RPM can monitor signal performance and adjust transmit parameters for each card as appropriate. As a starting point, each card can be programmed to set its starting transmit power according to its sensed position in the chassis, with design analysis used to set appropriate power for each slot. These values can be further tailored dynamically, depending on the number of cards inserted in the chassis.

Although several embodiments and alternative implementations have been described, many other modifications and implementation techniques will be apparent to those skilled in the art upon reading this disclosure. For instance, with sufficient bandwidth, direct line card-to-line card backplane transmissions could also be allowed. Such functionality could be useful, for instance, when two line cards must work together, such as for a link aggregation split across two line cards. Since the wireless function queue memory can be implemented with virtual queues in a shared memory, a programmable wireless controller/memory manager solution can be allowed to add new control plane functionality simply by providing additional addresses and/or queue structures for the functionality, with the card processors on the line cards and RPM cards coded to generate and consume packets for the new control function. A specific type of switch implementation has been used in the examples, but the concepts described herein are equally applicable to other switch implementations, such as those without epochs or epoch scheduling.

Although the specification may refer to "an", "one", "another", or "some" embodiment(s) in several locations, this does not necessarily mean that each such reference is to the same embodiment(s), or that the feature only applies to a single embodiment.

I claim:
1. A hybrid backplane, comprising:
an electrical backplane board including:
at least one line card connector located on the electrical backplane board;
at least one switch fabric card connector located on the electrical backplane board;
at least one route processing manager connector located on the electrical backplane board; and
physical, high speed data connections located in the electrical backplane board and extending between the at least one line card connector and the at least one switch fabric card connector, wherein at least one of the at least one line card and at least one switch fabric card is configured to transmit high speed data plane communications, and wherein the physical, high speed data connections are configured to provide the high speed data plane communications between at least one line card and at least one switch fabric card when the at least one line card is coupled to the at least one line card connector and the at least one switch fabric card is coupled to the at least one switch fabric card connector; and a wireless backplane system that is located on the electrical backplane board and that is configured to:

receive an antenna on each of the at least one line card, the at least one switch fabric card, and at least one route processing manager when the at least one line card is coupled to the at least one line card connector, the at least one switch fabric card is coupled to the at least one switch fabric card connector, and the at least one route processing manager is coupled to the at least one route processing manager connector, wherein at least one of the at least one line card, the at least one switch fabric card, and at least one route processing manager is configured to transmit network protocol traffic, scheduling traffic, and card management traffic, and wherein the wireless backplane system is configured to provide for wireless communication of the network protocol traffic, the scheduling traffic, and the card management traffic between the at least one line card, the at least one switch fabric card, and the at least one route processing manager when the at least one line card is coupled to the at least one line card connector, the at least one switch fabric card is coupled to the at least one switch fabric card connector, and the at least one route processing manager is coupled to the at least one route processing manager connector.

2. The hybrid backplane of claim 1, wherein the at least one line card connector includes a plurality of line card connectors.

3. The hybrid backplane of claim 2, wherein each of the plurality of line card connectors are configured to couple to a line card that include a wireless transceiver connected to an antenna which is received by the wireless backplane system.

4. The hybrid backplane of claim 1, wherein the electrical backplane board and the wireless backplane system operate to receive ingress data traffic from and transmit egress data traffic to peer devices.

5. The hybrid backplane of claim 1, wherein the high speed data plane communications include receiving information from a network, processing the information and forwarding the information to a destination on the network.

6. The hybrid backplane of claim 1, further comprising:
physical traces located in the electrical backplane and extending between the at least one line card connector, the at least one switch fabric card connector, and the at least one route processing manager connector, wherein the physical traces are configured to provide for the transmission of clock timing information between the at least one route processing manager, the at least one line card, and the at least one switch fabric card.

7. The hybrid backplane of claim 1, wherein
the network protocol traffic provides for communication between a plurality of master routing/switching protocols running on the at least one route processing manager, and between at least one of the plurality of master routing/switching protocols and the at least one line card;

the scheduling traffic provides for the at least one route processing manager to coordinate and synchronize the internal transmission of packet data between the at least one line card and the at least one switch fabric card; and the card management traffic provides for the at least one route processing manager to monitor, configure, and manage hardware on the at least one line card and the at least one switch fabric card.

8. The hybrid backplane of claim 1, wherein the wireless backplane system is comprised of a wireless waveguide with a plurality of antenna receptor apertures.

9. A packet network device, comprising:
a chassis housing:
an electrical backplane board;
a wireless backplane system located on the electrical backplane board;
at least one line card connected to the electrical backplane board and including an antenna received by the wireless backplane system;
at least one switch fabric card connected to the electrical backplane board and including an antenna received by the wireless backplane system; and
at least one route processing manager connected to the electrical backplane board and including an antenna received by the wireless backplane system;
wherein the electrical backplane board includes physical, high speed data connections that are configured to provide high speed data plane communications between the at least one line card and the at least one switch fabric card; and
wherein the wireless backplane system is configured to provide for wireless communication of network protocol traffic, scheduling traffic, and card management traffic between the at least one line card, the at least one switch fabric card, and the at least one route processing manager.

10. The packet network device of claim 9, wherein the at least one line card includes a plurality of line cards.

11. The packet network device of claim 10, wherein each of the plurality of line cards include a wireless transceiver connected to an antenna which is received by the wireless backplane system.

12. The packet network device of claim 11, wherein the antenna on at least one of the plurality of line cards is configured to move relative to that line card to be received by the wireless backplane system.

13. The packet network device of claim 9, wherein the at least one line card, the at least one switch fabric card, and the at least one route processing manager are configured to receive ingress data traffic from and transmit egress data traffic to peer devices.

14. The packet network device of claim 9, wherein the high speed data plane communications include receiving data traffic from and transmitting data traffic to peer devices.

15. The packet network device of claim 9, further comprising:
physical traces located in the electrical backplane and extending between the at least one line card connector, the at least one switch fabric card connector, and the at least one route processing manager connector, wherein the physical traces are configured to provide for the transmission of clock timing information between the at least one route processing manager, the at least one line card, and the at least one switch fabric card.

16. The packet network device of claim 9, wherein
the network protocol traffic provides for communication between a plurality of master routing/switching protocols running on the at least one route processing manager, and between at least one of the plurality of master routing/switching protocols and the at least one line card;
the scheduling traffic provides for the at least one route processing manager to coordinate and synchronize the internal transmission of packet data between the at least one line card and the at least one switch fabric card; and
the card management traffic provides for the at least one route processing manager to monitor, configure, and manage hardware on the at least one line card and the at least one switch fabric card.

17. The packet network device of claim 9, wherein the wireless backplane system is comprised of a wireless waveguide with a plurality of antenna receptor apertures.

18. A method for providing communication in a packet network device, comprising:
connecting at least one line card to an electrical backplane board such that an antenna on each at least one line card is received by a wireless backplane system that is located on the electrical backplane board;
connecting at least one switch fabric card to the electrical backplane board such that an antenna on each at least one switch fabric card is received by the wireless backplane system; and
connecting at least one route processing manager to the electrical backplane board such that an antenna on each at least one route processing manager is received by the wireless backplane system;
transmitting, by at least one of the at least one line card and the at least one switch fabric card, high speed data plane communications, wherein the high speed data plane communications are provided between the at least one line card and the at least one switch fabric card using physical, high speed data connections in the electrical backplane board; and
transmitting, by at least one of the at least one line card, the at least one switch fabric card, and the at least one route processing manager, network protocol traffic, scheduling traffic, and card management traffic, wherein the network protocol traffic, the scheduling traffic, and the card management traffic is provided between the at least one line card, the at least one switch fabric card, and the at least one route processing manager via wireless communication using the wireless backplane system.

19. The method of claim 18, wherein the at least one line card includes a plurality of line cards.

20. The method of claim 19, wherein each of the plurality of line cards include a wireless transceiver connected to an antenna which is received by the wireless backplane system.

21. The method of claim 18, further comprising:
moving the antenna on at least one of the plurality of line cards relative to that line card to be received by the wireless backplane system.

22. The method of claim 18, wherein the high speed data plane communications include receiving data traffic from and transmitting data traffic to peer devices.

23. The method of claim 18, further comprising:
providing for the transmission of clock timing information between the at least one route processing manager, the at least one line card, and the at least one switch fabric card using physical traces extending through the electrical backplane between the at least one line card, the at least one switch fabric card, and the at least one route processing manager.

24. The method of claim 18, wherein
the network protocol traffic provides for communication between a plurality of master routing/switching protocols running on the at least one route processing manager, and between at least one of the plurality of master routing/switching protocols and the at least one line card;
the scheduling traffic provides for the at least one route processing manager to coordinate and synchronize the internal transmission of packet data between the at least one line card and the at least one switch fabric card; and
the card management traffic provides for the at least one route processing manager to monitor, configure, and manage hardware on the at least one line card and the at least one switch fabric card.

25. The method of claim 18, wherein the wireless backplane system is comprised of a wireless waveguide with a plurality of antenna receptor apertures.

* * * * *